United States Patent [19]

Lulay

[11] Patent Number: 4,577,072

[45] Date of Patent: Mar. 18, 1986

[54] TELEPHONE EQUIPMENT TESTER

[75] Inventor: John R. Lulay, Chicago, Ill.

[73] Assignee: Dynascan Corporation, Chicago, Ill.

[21] Appl. No.: 567,100

[22] Filed: Dec. 30, 1983

[51] Int. Cl.[4] ............................................. H04M 1/24
[52] U.S. Cl. ..................... 179/175.1 R; 179/175.2 A;
  179/175.2 B; 179/175.25; 340/645; 324/66
[58] Field of Search ......... 179/175.2 R, 175, 175.1 R,
  179/175.2 A, 175.2 B, 175.2 C, 175.25;
  340/825.16, 652, 656, 649, 645; 361/245;
  324/51, 158 D, 66

[56] References Cited

U.S. PATENT DOCUMENTS 3,818,329  6/1974  Reaves .................................. 324/66

OTHER PUBLICATIONS

Telephone Tester Detects Line Distortion, Hector Urbina, Electronics Sep. 27, 1979, pp. 151-152 vol. 52, No. 20.

*Primary Examiner*—Stafford D. Schreyer
*Attorney, Agent, or Firm*—Russell E. Hattis; Stephen R. Arnold

[57] ABSTRACT

A tester for telephones and telephone answering systems features a dialing test capability for high speed dialing systems by providing the dialed digits in a single display element serially in time at a delayed rate set by strobing the digits from a memory storage element. A two-level ringing signal is provided to test for marginal telephone bell sensitivity. Means are further provided for reversing the emulation of the central office battery polarity so as to test for diode failure in electronic telephones. A simple cord circuit test for open- and short-circuit in the wall and handset cords, and moreover provides for detection of connector wiring reversal. Precision long-duration ringing burst capability is provided, along with ringback, dial tone, cut-out, and two-way communication between a telephone answering system under tests and a supplemental telephone as to provide for complete testing of the various phases of actuation of automatic answering systems.

11 Claims, 11 Drawing Figures

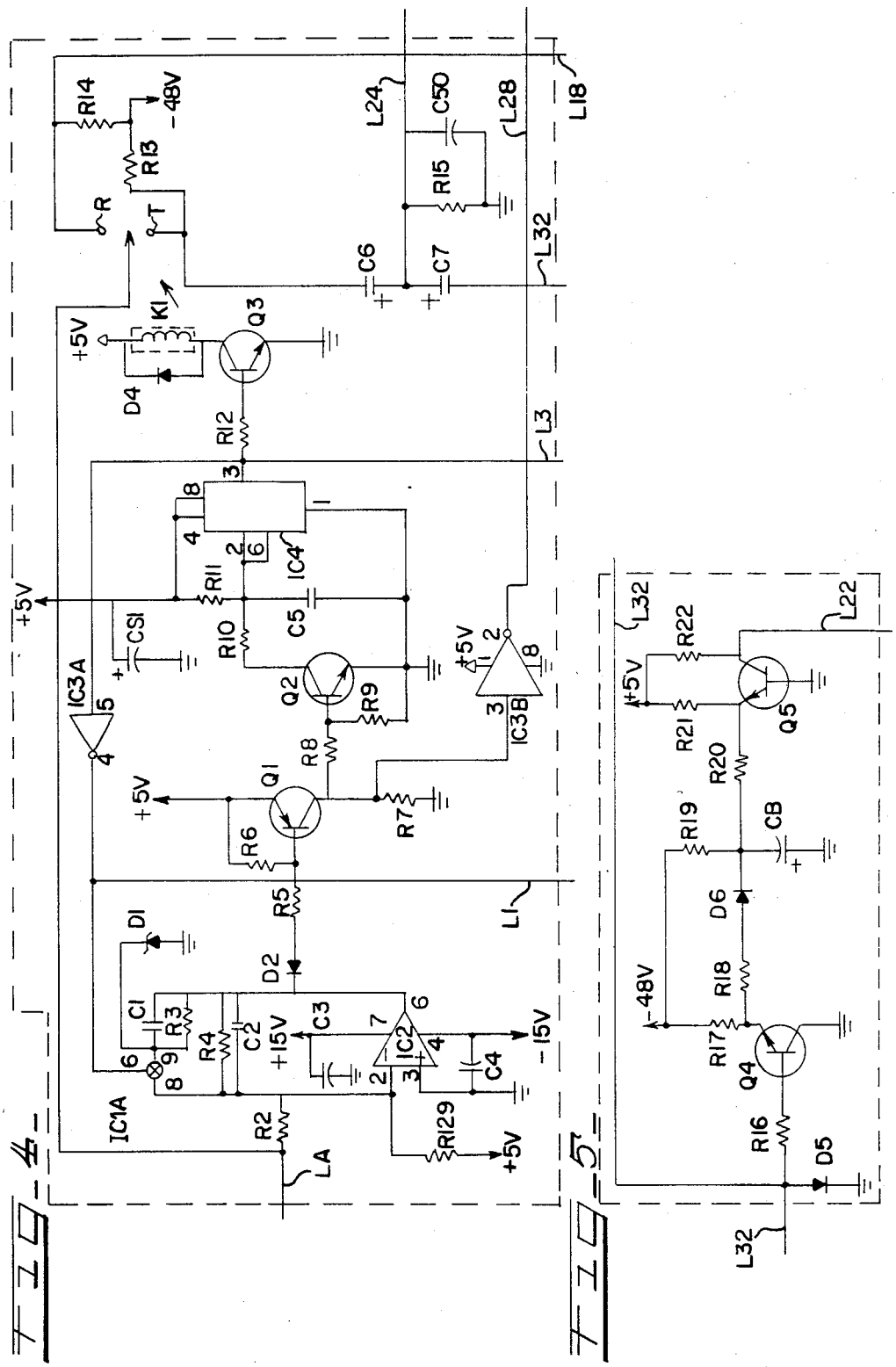

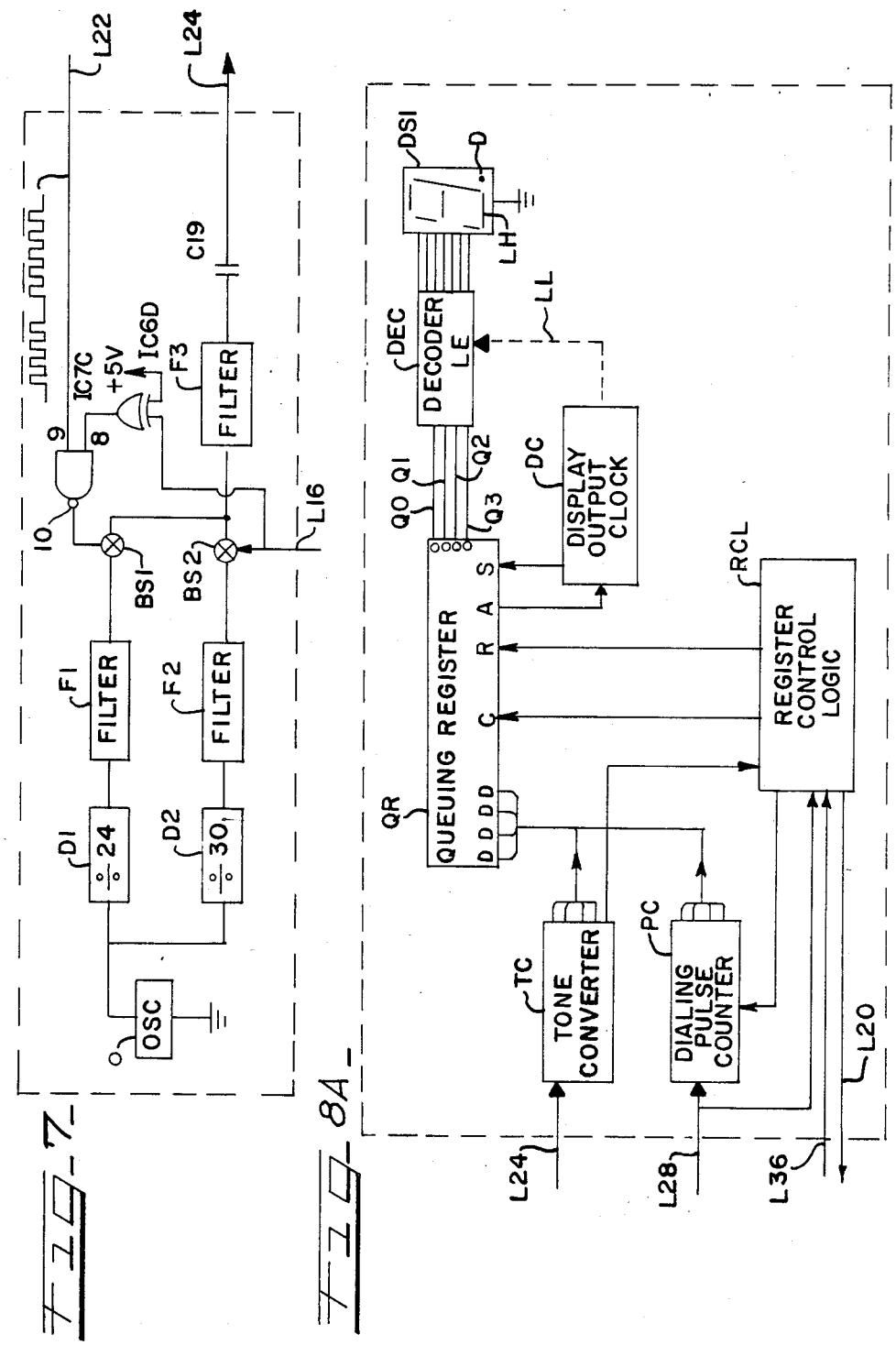

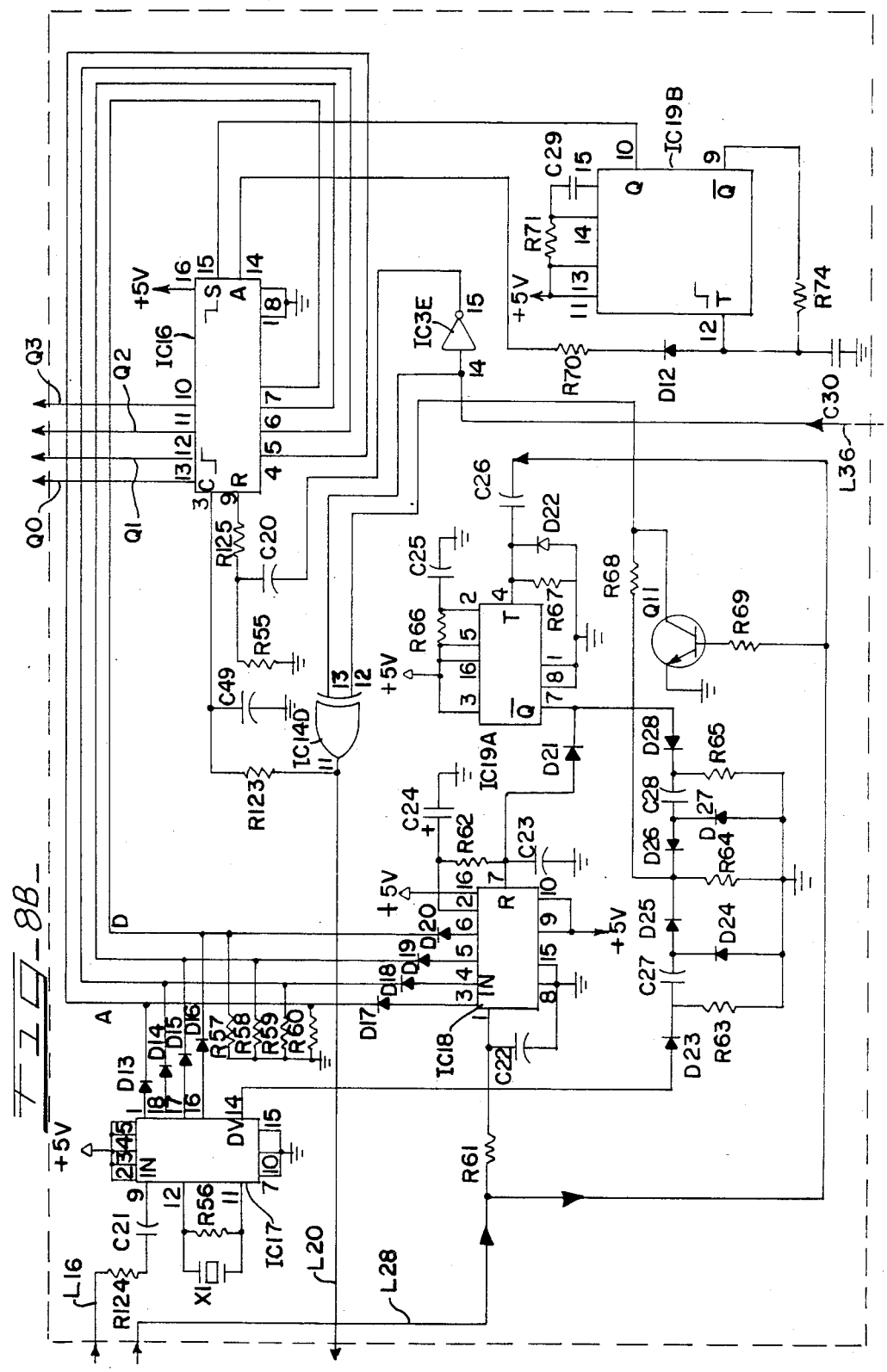

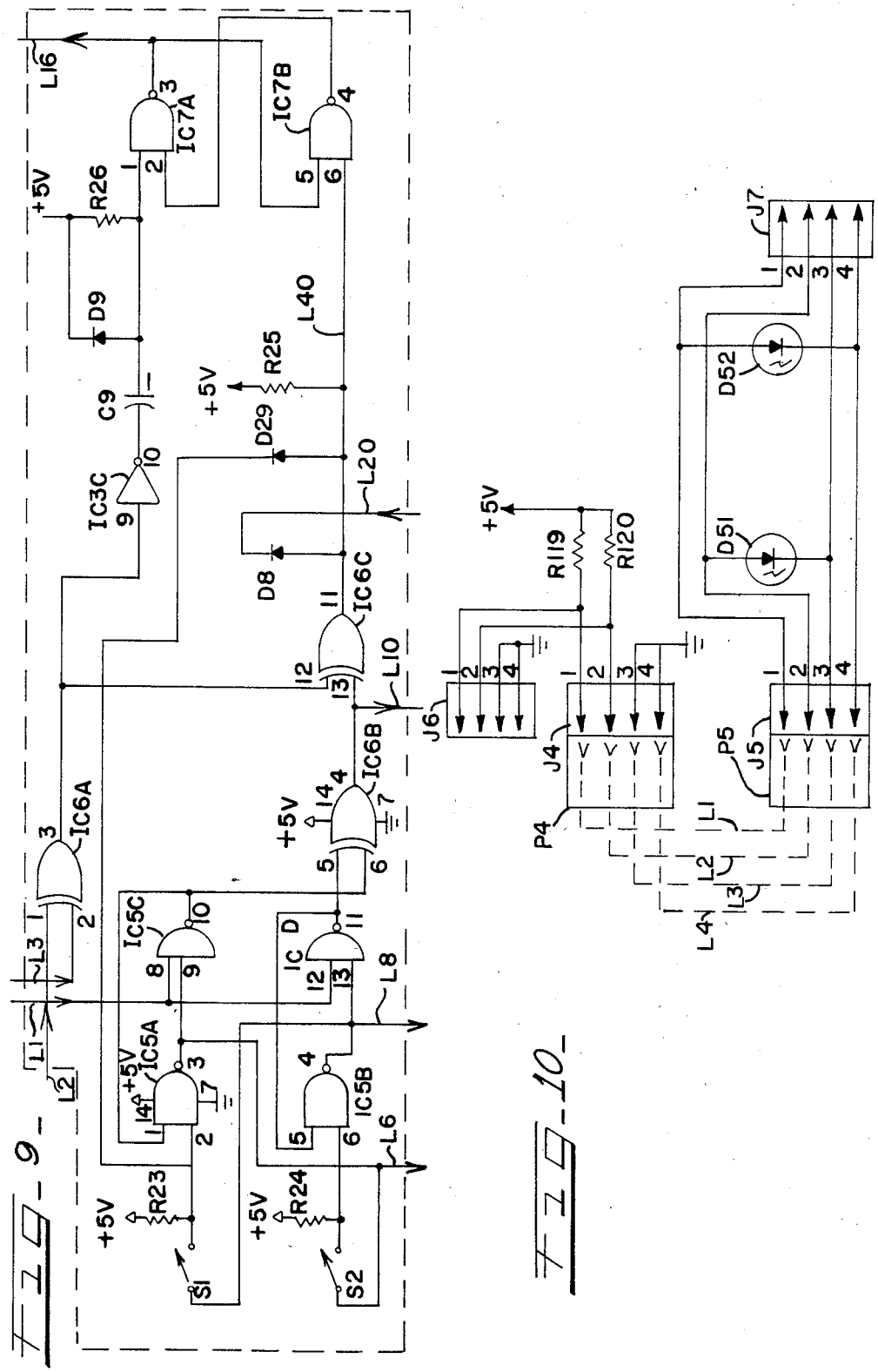

TELEPHONE EQUIPMENT TESTER

TECHNICAL FIELD OF THE INVENTION

The technical field of the invention is telephone test equipment, in particular that equipment which tests telephone handset voice quality and level, telephone bell ringing capability and sensitivity, dialing signal reliability, and cord continuity, and equipment which tests the operation of telephone answering equipment.

BACKGROUND OF THE INVENTION

With the advent of the privately owned home telephone, and the high expense of service calls, wherein a repairman must personally visit the dwelling or other installation where the telephone is located, a need has arisen for diagnostic telephone test instruments which can be kept at service facilities and to which the telephone owner may bring his telephone for diagnostic testing. Current commercially available telephone equipment testers used at such service facilities commonly test the basic operability of the telephones and cords therefor, but not telephone answering equipment, and are generally very expensive pieces of equipment.

In addition to a desirable low cost objective, such equipment should be as simple as possible for untrained personnel to use and should have the capability of testing the principal functions carried out by both telephone handset and telephone answering equipment. To the applicant's knowledge, all currently existing telephone equipment testers fail to satisfy one or more of these objectives.

For example there remains a need for an inexpensive means for testing the accuracy of the dialing system, both pulse dialing and tone dialing. One current approach is embodied in the Teltone M-501 telephone tester manufactured by Teltone Corporation, Kirkland, Washington. In this unit, upon dialing a given digit, a replica of the digit dialed is presented as a visual display in a single-digit readout display unit configured in the form of a well-known light-emitting diode digital display unit. If the digit displayed does not correspond to the digit dialed, the tester knows that the dialing system is malfunctioning.

Such a system is inexpensive and functions quite adequately in the testing of a manual pulse or time dialing system; however, it cannot test the operation of an automatic dialing telephones which have frequently dialed numbers stored in memory therein. The memory sections of these telephones produce high speed pulse readout representing the chosen stored telephone number, and the single digit display portions of this tester cannot properly respond to the multi-digit readout pulses of these telephones since the user is unable to distinguish the digits on the display because the user sees nothing but a high speed flickering of the display during such a test. One expensive solution to this problem has been the use of a multi-digit display incorporated in telephone test equipment Model No. PAL-1 made by Conway Engineering Inc., of Oakland, Calif. This unit employs a microprocessor-based multi-digit storage and readout system wherein the entire dialed telephone number appears as a serial string in a multi-digit display element capable of accommodating up to 16 digits. However, there remains a need for an inexpensive one digit display tester which can test the high speed dialing capability of these automatic dialing telephones.

Because those telephones communicating with a given central office may be connected to telephone lines of lengths of up to 10 miles, the effective line length being determined by the proximity of the telephone to the central office, the bell ringing system of telephones must be adequately responsive over a wide range of possible line impedances between the telephone and the central office. To cope with this and related problems, telephones are designed to ring on all signals above a certain minimum level (40 volts r.m.s. typically), but not below this level. Defective telephones sometimes will not respond to this minimum level, and so will not operate properly at the maximum distance from the central office. Neither of the above mentioned telephone testers provides a way of determining whether the bell circuit of the suspect telephone is capable of ringing at the minimum level.

During the initial introduction of tone-dialing telephones, the polarity of the DC voltage locally applied to such telephones via the in-house telephone cabling was deliberately reversed so that tone-dialing telephones would not operate. As a result, many of these wiring installations today provide an improper polarity at the wall plug into which polarity responsive telephones are to be plugged. To avoid this problem electronic tonedialing telephones are now manufactured with a bridge circuit consisting of four steering diodes to accommodate either polarity of DC voltage applied thereto, so that such telephones may be connected to lines of either polarity. As will subsequently be discussed in detail, failure of these steering diodes can cause the given telephone to function on a line of one polarity, but not the other, with the result that the user finds that his telephone will function properly when plugged into some wall outlets, but will be totally inoperative when connected to others. Inexpensive telephone testing equipment useful at publically available service facilities to providing a rapid test for steering diode failure has not been heretofore available.

In the manufacture of the 4-wire telephone cords having keyed connector plugs at either end, and configured to connect between the telephone handset and the telephone base, and from the telephone base to the telephone wall outlet, occasionally one end connector will be miswired by the manufacturer, i.e. the wiring at one connector will be completely reversed. Although both of the above referenced telephone testers have provision for testing short and opencircuits in such cords, neither provides provision for detecting such reversal. This constitutes a serious drawback, since a reversed cord may readily pass conventional short- and open-circuit tests, and yet be completely non-functional. Moreover, both of the above referenced testers require a rather complex interpretation of multi-light open and shortcircuit indicators, which can be a source of confusion to users who either do not have adequate training, or who use the tester only infrequently. Thus, there is a need for a simple, easily interpreted cord tester which will have the capability of detecting such wiring reversals.

Finally, there is a need for a test system which will test not only telephones, but which will also test for proper operation of automatic telephone answering systems. Such systems are designed to automatically come on line after a prescribed ringing interval, produce a recorded message in a playback mode, thereupon actuate to a recording mode for accepting messages, and then revert to the dormant waiting state. To the applicant's knowledge, there is no system currently available which adequately emulates signal conditions applied to such automatic answering services to allow a thorough and easily conducted test thereof.

SUMMARY OF THE INVENTION

According to one feature of the invention, the inherent simplicity of a single digit display dialing tester is provided, while providing a useful readout under automatic high speed dialing conditions. This is accomplished by the use of a memory storage system which stores the binary representation of each dialed digit as received, and which is then actuated to output the stored digits in this same order, the output rate being governed to be no greater than preferably two digits per second. Thus, a high speed dialing string is captured in temporary storage and subsequently slowly sequentially displayed on the single digit display. The storage system further preferably has the property that under normal low speed dialing conditions the dialed digits are strobed immediately to the display element.

According to a specific aspect of this feature of the invention, the memory storage system is in the form of a first-in-first-out shift register connected to accept binary representations of each dialed digit serially at the input and to store them as a queue at the output, to be strobed out on demand by a strobing circuit restricted to a finite strobing rate. By this means high speed dialing string capture is achieved at a modest increment of expense over the Teltone signal display system and without requiring the multidigit display system and associated microprocessor used in the above referenced Conway system, thereby substantially contributing to a reduction in cost of the unit.

According to still another feature of the invention, a bell ringing sensitivity test is provided which gives the user a choice of two different signal levels for the ringing signal, one signal preferably being a fraction like one-half the other, so that a marginally sensitive telephone bell may be detected.

According to a further feature of the invention means are provided to reverse the polarity of the system voltage applied to the telephone under test to test for defective diodes, a defective diode being indicated by the fact that the telephone will operate properly in one polarity, but not in the other.

According to a further feature of the invention the tester preferably includes a one-pass cord test which operates simply by plugging the two ends of the cord into the tester. Good, short or open circuit conditions will be immediately indicated preferably by different conditions of a pair of display lamps or other display elements. The conditions are different combinations of the lighted conditions of one or more of the lamps. Most cord testers required first the plugging of one end and then the plugging of both ends of the cord to test for both of these conditions. Moreover, in the present invention miswired plugs are indicated by a de-energized state of both lamps, a feature not heretofore available.

In accordance with a related feature of the invention, a telephone and automatic answering system test instrument is provided which preferably not only can test the telephone completely but also fully emulates a two-way interaction of a calling system and the system of the called party. Complete dial tone and ringback tone emulation is also preferably provided for testing of interactive automatic answering systems.

According to a further feature of the invention, an infinite series of automatic precisely timed line ringing signals can be provided by the tester so that the actuation and subsequent performance of automatic answering equipment may be tested. Such equipment is frequently designed to be quite sensitive to the nature and timing of the ringing signals in order to undergo initial actuation. Providing only for manual generation of the ringing signals can thus frequently fail to operate properly operating automatic telephone answering equipment because of the impossibility of its user accurately manually controlling the duration of the ringing bursts.

It is also desirable to provide in such a tester a completely accurate emulation of a two-way conversation using a test telephone known to be good in conjunction with the system, and an emulation of dial tones, ringback signals, and ringing signals, along with conventional automatic dial tone suppression on telephone pick-up emulation of the equipment, so that an audible indication (i.e. cessation of ringing) upon answering system activation is obtained. Recurrence of dial tone on hang-up of the monitor telephone is also provided so as to actuate those kinds of answering equipment under test which require such reappearance to terminate their operation. Thus, by relatively inexpensive means many of the principal shortcomings in the prior art telephone testing systems are overcome in relatively inexpensive way, the tester of the present invention additionally providing additional desirable features not otherwise currently available in the art.

Other features and advantages of the invention will become apparent upon making reference to the specification to follow, the drawings, and the claims.

DESCRIPTION OF DRAWINGS,

FIG. 4 is a circuit diagram of the first hook sensing unit and the associated switch unit of FIG. 3.

FIG. 5 is a circuit diagram of the second hook sensor associated with the second input jack of FIG. 3.

FIG. 7 is a circuit diagram of a ringback/dial tone synthesizer circuit of FIG. 3.

FIG. 8a is a functional block diagram of the principal elements of the dialing display readout system of FIG. 3.

FIG. 8b is a circuit diagram of the principal elements of the dialing display readout system of FIG. 8a.

FIG. 9 is a circuit diagram of the central control logic circuit of FIG. 3, and

FIG. 10 is a circuit diagram of the cord test circuit of FIG. 3.

DETAILED DESCRIPTION OF EXEMPLARY EMBODIMENT OF THE INVENTION SHOWN IN DRAWINGS

Figure 1:
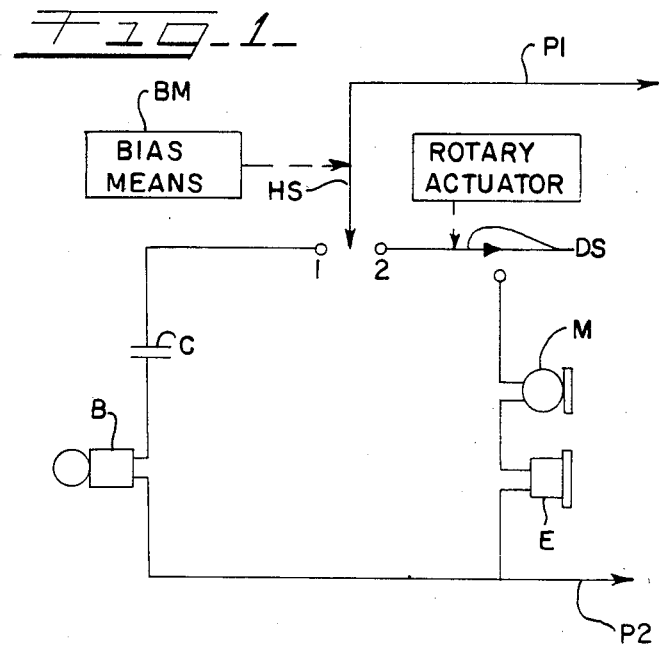
FIG. 1 is a functional diagram of a pulse dialing telephone.

FIG. 1 is a functional diagram of a simple mechanical rotary dial telephone. Terminals P1 and P2 are normally connected to a pair of telephone lines over which the central office transmits ringing signals for actuating a telephone bell B, such signals being normally of the order of 100 volts r.m.s. and coming in twenty cycle bursts of approximately one second duration at intervals of four seconds. When the telephone is in the cradle, i.e. "on hook", a two-position hook switch HS is forced against a spring bias means BM to force the rotor of the switch to contact Terminal 1. At this point the alarm bell B is connected across the lines P1 and P2 in series with a blocking capacitor C.

In addition to supplying a ringing signal from the central office, lines P1 and P2 are also supplied from the central office with a nominal 48 volt DC potential therebetween. Thus, with the telephone on-hook, direct current flow to the bell B is blocked by the capacitor C; however, when a ringing signal is passed to the telephone from the central office the bell B is actuated. When the telephone is picked up out of the cradle, i.e. "off-hook", the bias means BM forces the hook switch HS to contact Terminal 2, thereby placing a series combination of a microphone M and an earphone E across the line through a dialing switch DS. The dialing switch is normally closed, and is only actuated when the dial is first rotated and then released, whereupon during back rotation the dial switch DS is open and closed at a 10 pulse per second rate as set by a rotary actuator RA.

Upon picking up the telephone, causing the hook switch HS to contact terminal 2, a relatively low impedance circuit of the order of several hundred ohms is thus connected across input terminals P1 and P2. This insertion of a relatively low impedance across these terminals causes a current to flow through the telephone lines, this current being sensed at the central office, whereupon the ringing signals are automatically removed from the line, and the telephone circuit is in condition for conversational mode. System power is supplied by a 48 volt battery at the telephone central office.

Alternatively, when the user wishes to initiate a call, he lifts the phone from the cradle, causing the hook switch to contact terminal 2, thereby again causing a loading condition to be observed at the central office. Subsequent dialing causes the dialing switch DS to open and close at a rapid rate, causing a pulsed line load sensing at the central office, which is used to actuate the dialing cross-bars to connect the telephone of the dialing party to that of the party called.

Thus there are three salient features to a telephone of this type: first, in the dormant state (on-hook) the line loading between terminals P1 and P2 is negligible and the switch HS is positioned to pass the high voltage ringing signal to the bell B; second, when the phone is off-hook the telephone line is substantially loaded between points P1 and P2; and finally, pulse dialing causes this loaded condition to be released in a series of cycles.

Figure 2:
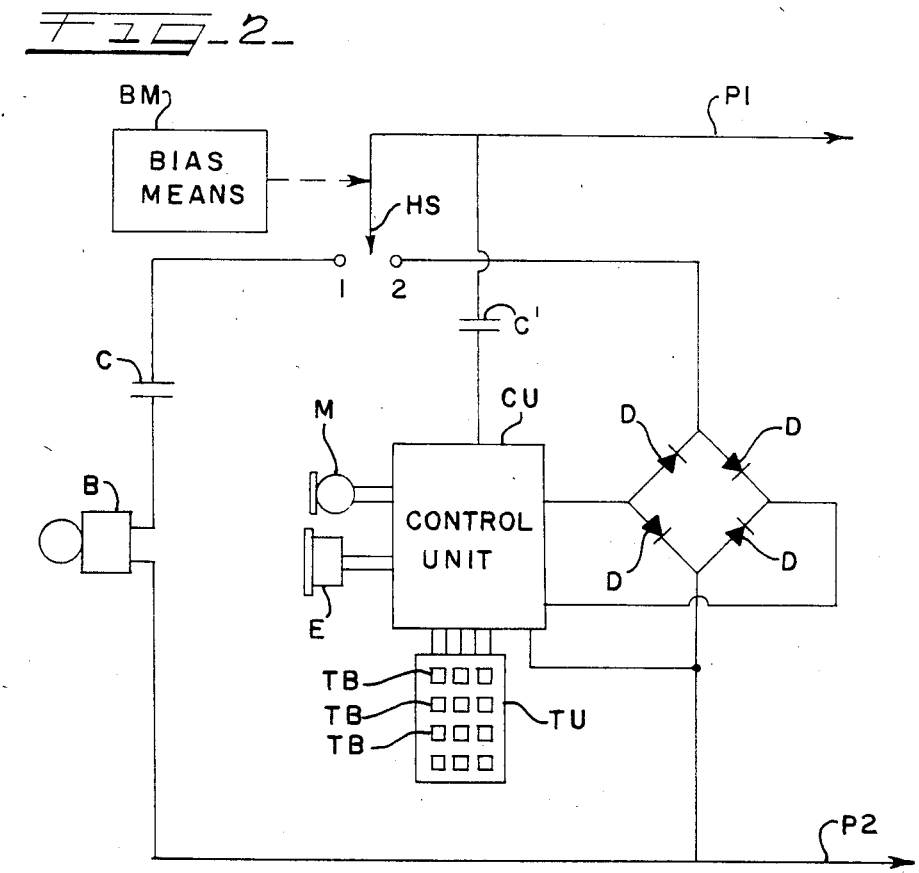
FIG. 2 is a functional diagram of a pushbutton dialing (tone dialing) telephone.

FIG. 2 shows a general functional overview of one version of a current electronic telephone. It will be noted that the bell system shown here is identical with that of FIG. 1; however, this bell circuit may also be achieved by purely electronic methods. Since such telephones contain electronic circuitry requiring a DC voltage of appropriate polarity, a bridge arrangement of four steering diodes D-D provides power from the central office battery of proper polarity to an electronic control unit CU. The control unit CU has associated therewith a microphone M and earphone E as before, but also includes an associated tone unit TU having a block array of pushbutton switches TB-TB, depression of the tone buttons sequentially causing the emission of a series of chorded tones from the control unit CU via blocking capacitor C' to the central office via lines P1 and P2.

These chorded dialing tones produced by the control unit CU are generally of the same order of magnitude as the normal conversational signals produced by the microphone. Thus, although the central office can sense the pick-up of a telephone as before, the dialing pulses are no longer a series of intermittent releases of the heavy load placed across lines P1 and P2, but consist instead of relatively moderate signals in the audio range. The central office is provided with equipment for decoding and further processing such dialing information. The control unit CU does, however, place a substantial load between points P1 and P2 upon pick-up, as was the case in the simpler system shown in FIG. 1. The system of the present invention is designed to provide extensive testing to all basic functions of telephones of either type.

Figure 3:
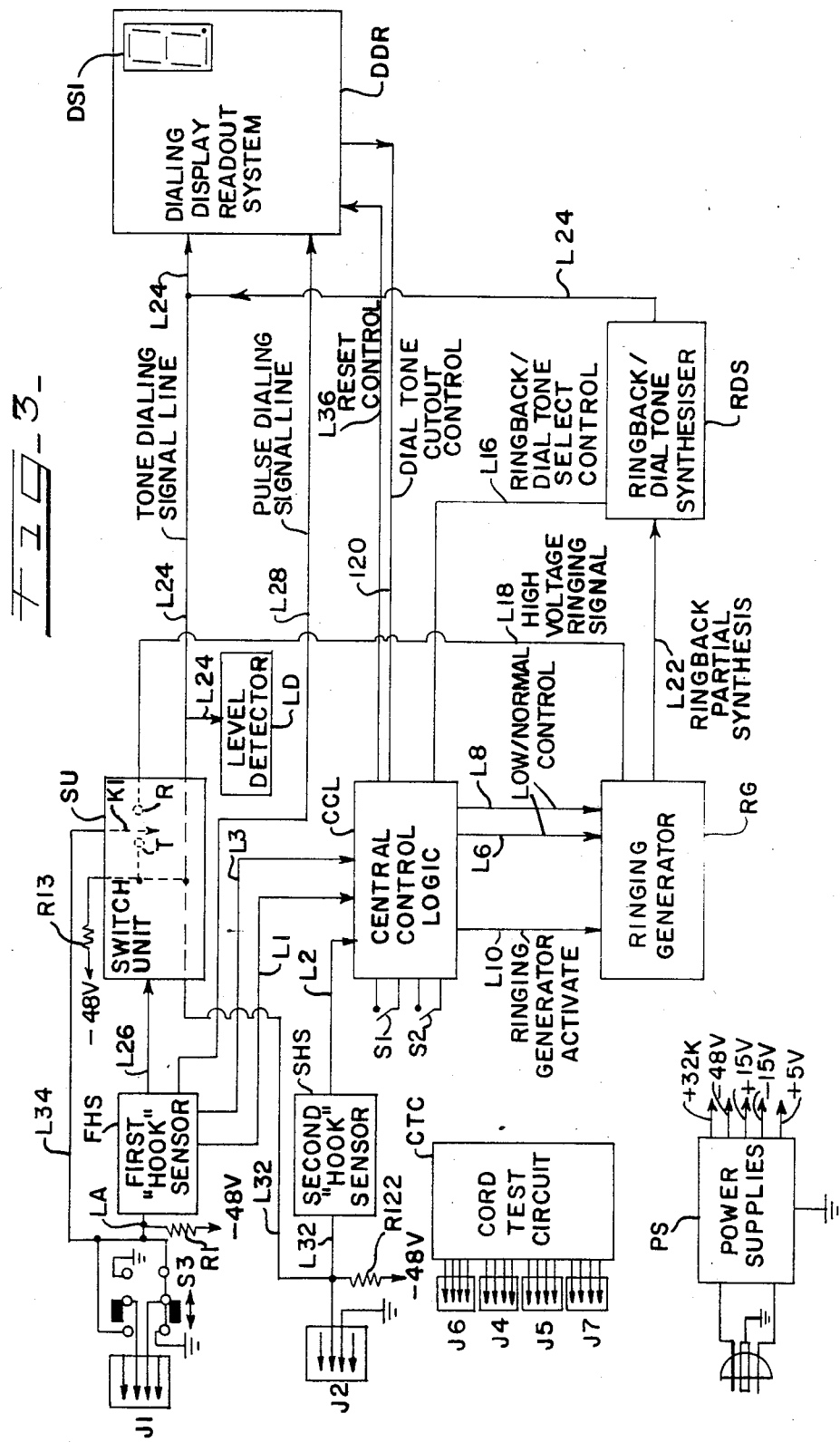
FIG. 3 is a general system block diagram of a telephone test circuit showing hook sensing circuits connected to two telephone plug-in jacks to detect pick-up of a telephone connected to either, an associated switch unit and central logic circuit for controlling system operations in the tester and having a pair of associated switches, a ringing generator for producing a high voltage ringing signal to test the bell in a telephone plugged into one of the input jacks, a ringback/dial tone synthesizer for providing an audible signal indicative of a distant phone being rung, a level detector giving an indication of the strength of the audible signal produced by the telephone being tested, a dialing display readout system for sequentially portraying dialed digits, a cord test circuit for testing continuity and shortcircuits in telephone cords, and associated power supplies.

FIG. 3 is functional block diagram of the elements of the system, showing control and signal lines running therebetween. The system is capable of testing a questionable telephone plugged into a first jack J1, here drawn to indicate the customary four lead type, with the two interior terminals representing the normal telephone line terminals to which a telephone of either type shown in FIGS. 1 and 2 may be connected. The system may be used in two modes, either a "telephone testing" mode for testing a questionable telephone unit plugged into jack J1, or alternatively in an "answering system" mode wherein a telephone answering sytem is plugged into jack J1 and a telephone known to be operating properly is plugged into jack J2, and wherein the answering system is tested for response to a ringing signal, for subsequent actuation in response to the ring, as well as for the audio quality of any messages stored internally in the answering system as well as the quality of recorded test messages sent to the answering system via jack J2.

Considering first the telephone test mode, wherein the telephone to be tested is connected to jack J1, when the telephone is on-hook, it will be recalled that virtually no load is presented across the terminals of J1. An equivalent of the system central office battery of 48 volts is supplied to line LA and thence to the two terminals of the telephone connected at jack J1 through a polarity reversing switch S3, the battery voltage being supplied through resistor R1, of nominal value 10,000 ohms, to supply the operating current for the electronic telephone when needed, and to aid in detecting when the telephone is on hook.

In the initial or quiescent condition of the system with the telephone connected to jack J1 on-hook, a first "hook" sensor FHS senses the high impedance line condition presented at line LA and outputs control signals via line L26 to a switch unit SU and through a pair of lines L1 and L3 to a central control logic CCL, the central control logic generally governing the operation of the entire system. The switch unit SU here is symbolically represented as a single-pole double-throw switch interconnecting lines L18 and L34, the switch unit being actuated by the first hook sensor FHS via line L26 to place the rotor of switch K1 on terminal R. This is the quiescent state of the system, with the telephone on-hook.

To test the alarm bell B (FIGS. 1, 2) a momentary contact switch S1 associated with the central control logic CCL, and hereafter alternatively referred to as the "reset/low" switch, is pushed momentarily into contact. A control signal from the central control logic via line L10 to a ringing generator RG causes the ringing generator to produce at its output line L18 a 50 volt r.m.s. twenty cycle sinusoidal ringing signal. These ringing signals come in bursts of one second duration, separated by four second quiet intervals. Lines L6 and L8 from the central control logic CCL to the ringing generator RG control the ringing generator to produce the aforementioned 50 volt signal intially in this test. The ringing generator output is fed via line L18 to terminal R of the switch unit SU and thence through line L34 to the telephone connected to jack J1 and thence to the telephone. The failure of the telephone to ring is indicative either of inadequate bell sensitivity or defective electronic ringing circuitry.

If the bell B fails to ring, then switch S2 associated with the central control logic CCL, hereinafter alternatively referred to as the normal switch, is actuated, thereby changing the configuration of control signals on lines L6 and L8 leading to the ringing generator RG, causing the ringing generator RG to increase the ringing signal on L18 to 100 volts r.m.s. If a ringing signal is heard, then the bell sensivity is adequate for telephones located close to the central office, but possibly is inadequate for remote telephones. This completes the on-hook testing.

To test the remaining performance characteristics of the telephone, the telephone is now removed from its cradle, placing the hook switch HS (FIGS. 1, 2) on terminal 2 so as to place the microphone, earphone, and dialing system on-line across terminals P1 and P2, and thus across the terminals of jack J1. At this point, a substantial load is placed across these two terminals, thereby substantially shifting the potential of line LA at the input to the first hook sensor FHS. As a result, the first hook sensor actuates the switch unit SU via control line L26 to move the rotor of switch K1 to contact terminal T thereof, thereby establishing an audio signal path from the system input line L34 via switch K1 to audio signal lines L32 and L24, and connecting the second battery current path into the telephone circuit via R13 to supply rated telephone operating current. Also, an off-hook indicating control signal condition is established on lines L1 and L3 leading to the central control logic CCL, which responds to this condition by disabling the ringing generator RG by a control signal condition placed on line L10. Additionally, the central control logic CCL responds to this condition by sending a control signal condition on line L16 to a ringback/dial tone synthesizer RDS which synthesizes and generates a dial tone to line L24, which in turn appears on line L34 to the tested telephone via the switch unit SU. From this a measure of the sensitivity of the earphone E may be deduced, i.e. if the dial tone heard is weak or distorted, a defective earphone E or telephone control unit CU (FIG. 2) is suspected.

Next, a voice level test is carried out, so as to determine whether or not the telephone is producing voice signals of adequate level. To test this function, the reset/low switch S1 is momentarily depressed, which has the immediate effect on the central control logic CCL of sending an inhibiting control signal condition via line L16 to the dial tone synthesizer RDS, thereby removing the dial tone from the line. The operator then speaks into the telephone, whereupon voice signals are propagated over line L34 to line L24 and thence to a level detector LD, the level detector LD being most preferably of the peak-level detecting type and consisting of an amplitude comparator driving a light emitting diode (not shown), adequate voice level being indicated by the flickering of the LED.

At this point diode failure in electronic telephones as previously described may readily be tested. It will be noted that switch S3 will supply system power to the unit under test in either polarity. If adequate voice level is indicated by flickering of the LED with switch S3 in one position, but not the other, then diode failure should be suspected. A similar test may be conducted using an auxiliary telephone during two-way listening tests to be discussed subsequently.

At this time the voice quality may be measured as well, since a defective microphone may produce voice signals of adequate level, but severely distorted. Thus, if a second telephone known to be good is connected to jack J2 and the second telephone picked up, then a second hook sensor SHS detects the pick-up at the second telephone, communicating this pick-up sensing to the central control logic CCL, which responds to a two-phone pick-up signal condition represented on lines L2, L1, and L3 to disable the dial tone as before via line L16. Alternatively, one could have disabled the dial tone synthesizer RDS simply by pushing switch S1 (reset/low) into momentary contact. Either operation will disable the dial tone and allow the operator listening to the telephone connected to jack J2 and talking into the telephone connected to jack J1 to hear the audio signal produced by the telephone at J1 via the line path consisting of lines L34, switch unit SU, terminal T, and L32. By this means the quality of the voice transmission of the suspect telephone may be determined. The earphone of the telephone being tested at J1 may similarly be tested by speaking into the microphone of the telephone at J2.

The dialing system of the telephone is next tested by removing any telephone from jack J2, leaving the suspect telephone connected to jack J1. As before, upon picking up the telephone from its cradle, the central control logic CCL moves from is quiescent state to generate a dial tone in the test telephone as before. A reset control line L36 produces a clearing and resetting signal to the dialing display readout system DDR upon momentary depression of the reset switch S1 of the central control logic CCL. A series of test digits are then dialed from the telephone under test. If the test telephone is of the tone dialing type, then the audio tone signals go via lines L34 through terminal T of the switch unit SU and line L24 to a dialing display readout system DDR having associated therewith a single numerical display element DS1, preferably of the composite bar LED variety. Internal logic circuitry in the dial display readout system DDR upon receipt of the first dialed digit produces a control signal condition on line L20 to the central control logic CCL which causes this unit to output a control signal condition on line L16 to disable the dial tone synthesizer RDS so as to switch off the dial tone. This action emulates the action of a normal telephone central office in this respect. The dialed digits are displayed sequentially in the display element DS1, so that the user may verify that the digit appearing in the display corresponds to that digit represented by the tone button he has depressed. Failure of the proper digit to show up in the display element is indicative of a defective dialing system. Additionally, the strength of the dial tones can be detected visually by the level detector LD.

If alternatively the telephone is of the pulse or line-pull down type shown in FIG. 1, then these line disturbances enter the first hook sensor FHS via line LA and are split out there to go to the dialing display readout system through a specially dedicated pulse dialing signal line L28. The remainder of the system operates as before, i.e. dial tone is suppressed upon transmission of the first digit, and that digit appears in the display element DS1.

A novel aspect of the first hook sensor FHS is that, although such dialing pulses really represent transitions from on-hook to off-hook conditions, the internal circuitry of this elements ignores such rapid pull downs and remains in a holding state to maintain the switch unit control signal on line L26 to keep the rotor of switch K1 in contact with that of terminal T throughout dialing operations.

In either mode of dialing, either pulse or tone, the dialing display readout system DDR has a novel feature associated therewith which is particularly useful in testing high speed dialing systems, such as are found in telephones having numbers stored in memory, or which read such numbers from an inserted card. Once such telephones are activated in a dialing mode to transmit such numbers the transmission rate is so high that it would be impossible to distinguish usually the various digits as they appear on the display element DS1 of the dialing display readout system DDR. To cope with this problem in an inexpensive way, as contrasted with such prior art systems such as the previously mentioned Conway system, which portray the entire dialed number on a series of such display elements as a static display, there is provided in the dialing display readout system DDR a queuing register and associated control circuitry having the property that, irrespective of the speed with which dialing pulses are sent to this unit, they are strobed out to appear in the display element DS1 at a rate never to exceed two digits per second. By this means an inexpensive dial readout system is achieved.

Considering next the "answering" mode of the system, a telephone answering system is to be tested, the answering system is plugged into jack J1 and a telephone known to be good is plugged into jack J2. With both units initially on-hook, the central control logic CCL is in its quiescent state. It is in the nature of a properly functioning answering system that it is in the on-hook state until a ringing system is applied to it for a predetermined period of time, after which time it automatically goes to an off-hook condition, provides a message announcement transmission, followed by a reversion to a recording mode wherein it is prepared to accept and record incoming messages for a finite period of time. After this time period it automatically reverts to a dormant on-hook condition. Alternatively, some answering systems wait for reappearance of the dial tone after the calling party hangs up before reverting to the dormant state.

To test the features of the answering system, the telephone connected to jack J2 is picked up, whereupon the second hook sensor SHS detects the pick-up of the telephone, placing an off-hook signal condition on line L2 to the central control logic CCL, which condition, in combination with the on-hook signal condition produced by the first hook sensor FHS on lines L1 and L3, causes the central control logic to output a control signal condition on line L16 to actuate the dial tone synthesizer RDS to output a dial tone to the audio line L24 and thence back to jack J2 via line L32. Thus, on pick-up of the telephone on jack J2 a dial tone is heard.

Next, the normal switch S2 of the central control logic CCL is momentarily actuated by the user, this unit then establishing an actuating condition on line L10 to the ringing generator RG, and a normal ring (100 volts) signal condition on lines L6 and L8. Recalling that the answering system is on-hook, the switch unit SU has the rotor of its switch K1 on terminal R, as a result of which the ringing signal L18 is passed through line L34 to the answering system. Throughout this ringing period, and until an off-hook condition is established by the answering system, the combination of an off-hook condition produced by the second hook sensor SHS via line L2 and the on-hook control sensing established on lines L1 and L3 actuates the central control logic CCL to turn on the ringback/dial tone synthesizer RDS via line L16.

Under such conditions both the ringing generator RG and the ringback/dial tone synthesizer RDS are both enabled, and the ringing generator provides to the synthesizer a square-wave low-voltage replica of the ringing bursts via line L22. The synthesizer RDS generates accordingly a synchronous ringback signal on line L24 which then passes via line L32 to the telephone. As a result, upon pushing the normal switch S2, thereby initiating ringing of the answering system, a ringback signal is heard by the operator in the telephone plugged into jack J2.

If the answering system is operating properly, upon receipt of a prescribed number of ringing signals, it should automatically actuate to an off-hook configuration, typically sending out a pre-recorded announcement, and thereafter reverting for a limited period of time to a recording mode to accept messages, at the end of that time again reverting to an on-hook condition. If the answering system is operating properly, then as previously stated, after a prescribed number of ringing bursts transmitted to jack J1 by the ringing generator RG, and emulated by the synthesizer RDS and heard in the telephone plugged into jack J2, the answering system will switch to an off-hook condition, thereby loading line LA as in the case of a telephone pick-up. Both units are now off-hook, and the control signal configuration on lines L1, L2, and L3 will cause the central control logic CCL to disable the ringback signal produced by the synthesizer RDS via line L16, thereby terminating the ringback signal heard by the user. If such termination is not heard within the prescribed time interval, then the answering system is not actuating into the off-hook mode and is deemed defective.

Proper actuation of the answering system to an off-hook condition causes, as before, the first hook sensor FHS to actuate switch K1 of the switch unit SU to contact terminal T, thereby interconnecting the audio signal lines L34 and L32, so that the operator may listen for the pre-recorded signal. The operator is now in communication with the answering system, and may verify its operation by well-known means.

Finally, in order to verify that the answering system is terminating its action properly, i.e. reverting to an on-hook condition at the end of the recording cycle, provision is made to accommodate either of the two termination sequences normally employed by commercially available answering systems. In one common form of cycle termination the answering system will not revert to an on-hook condition until a dial tone reappears for a prescribed period of time, as when the calling party hangs up. The other termination system simply automatically goes to an on-hook condition after a prescribed period of time. Provision is therefore made so that upon hanging up the telephone connected to jack J2 a dial tone is immediately and constantly thereafter fed to the answering system at jack J1. This is accomplished by the appearance of an on-hook signal condition on line L2, in combination with an off-hook signal condition on line L3, these signal conditions actuating the central control logic CCL to enable the dial tone synthesizer RDS via line L16, resulting in a dial tone signal being fed via line L24 back to jack J1 via terminal T of switch K1 of the switch unit SU. The operator simply then checks for a visual indication of termination of the recording operation as evidenced by reel stoppage, control lights, etc. in the answering system.

If the system is of the time-out variety, however, the operator simply remains on-line until the prescribed time has elapsed, and which time the answering system should automatically produce an on-hook signal condition sensing on line L3. The off-hook signal condition on line L2 and a simultaneous on-hook condition on line L3 causes the central control logic CCL to produce a dial tone on line L24 as before, which is also returned to the telephone at J2 via line L32. In this case, the resumption of the dial tone as heard by the operator in his telephone serves as an audible indication that the answering system has properly restored itself to the dormant condition thereof.

In the detailed description to follow of the circuits of the system, and in particular in the circuit diagrams corresponding thereto, pin designations will be used which correspond to those of commercially available devices. Table I is a listing of devices having pin-outs compatible with the pin designations shown in FIGS. 4–8.

TABLE I
COMPONENTS LIST

| IC No. | Description | Representative Type |
|---|---|---|
| 1 | Quad Bilateral Switch | CD 4016 (RCA) |
| 2 | FET Operational Amplifier | TL 061 (TI) |
| 3 | HEX Inverting Buffer | CD 4049B (RCA) |
| 4 | Timer (Multivibrator) | NE 555 (SIG) |
| 5 | Quad Two-Input NAND Gate | CD 4011B (RCA) |
| 6 | Quad Exclusive-OR Gate | CD 4030 (RCA) |
| 16 | FIFO Queuing Register | CD 40105 (RCA) |
| 17 | Dual-Tone Multi-Frequency Receiver | SSI 202 (SSI) |
| 18 | Dual 4-stage Binary Up Counter | CD 4520B (RCA) |
| 19 | Dual Monostable Multivibrator | CD 4538B (RCA) |
| 23 | Timer (Multivibrator) | NE 555 (SIG) |
| 24 | Timer (Multivibrator) | NE 555 (SIG) |
| 25 | Quad Bilateral Switch | CD 4016 (RCA) |

In the above Table, the description (RCA) refers to Radio Corporation of America, (TI) refers to Texas Instruments Corporation, (SIG) refers to Signetics, Incorporated, (SSI) refers to Silicon Systems, Incorporated.

Considering next the various subcircuits of FIG. 3 in detail, FIG. 4 shows the circuit representing the first hook sensor FHS and the switch unit SU of FIG. 3. The purpose of this circuit is to output a signal condition on lines L1 and L3 indicative of an on-hook or off-hook condition sensed at the input jack J1, to actuate the switch K1 responsively to either of these two conditions, to pass tone dialing pulses during off-hook conditions to line L24, to output pulse dialing pulses to line L28, and to retain the switch K1 in a latched condition corresponding to an off-hook condition, i.e. contacting terminal T, in spite of the heavy line pull-downs associated with the pulse dialing operation.

In the on-hook condition, it will be recalled that the line terminals of jack J1 are essentially unloaded. Thus, with reference to FIG. 3, line LA is held substantially at minus 48 volts through resistor R1, resulting in a strong negative signal applied to the inverting terminal 2 of operational amplifier IC2, resulting in blockage of diode D2 connected to drive the base of transistor Q1. As a result, transistor Q1 is an open-circuit condition, similarly driving the base of transistor Q2 to place it in an open-circuit condition A type 555 resettable multivibrator IC4 is controlled by the collector of transistor Q2 from pin 2 thereof so that its output at pin 3 will remain in a low state as long as pin 2 is high, i.e. as long as transistor Q2 is off.

In the on-hook condition, as previously stated, transistor Q2 is turned off, and therefore output terminal 3 of the multi vibrator IC4 remains low, as a result of which transistor Q3 is turned off, and relay coil RC of switch K1 is deenergized, as a result of which the switch is contacting terminal R thereof, thereby establishing continuity between the ringing line L18 (see FIG. 3) and the input LA of the first hook sensor FHS. An inverter IC3A is connected to terminal 3 of the multivibrator-timer IC4, and the hook sensing signals are placed on lines L1 and L3 from either side of the inverter, line L3 representing the output state of the multivibrator IC4 and line L1 representing invariably the conjugate state of this line. The use of a line pair for control of the central control logic CCL is a matter of design choice to simplify the control circuitry.

Further, it will be noted that the operational amplifier IC2 is provided with a strong inverse feedback action via resistors R4 and R2, resistor R2 being typically of order 3 megohms, and R4 being of order 620 kilohms. In addition, across the feedback resistor R4 there is a parallel network consisting of capacitor C1 and R3, C1 being chosen of value approximately 0.47 microfarad and R3 being of value typically 3 megohms. In a series of this pair is an analog gate (bilateral switch) IC1A, the gate taking its sensing from the output of the inverter IC3A. Thus, in the on-hook condition, i.e. when terminal 3 of the multivibrator IC4 is low, pin 6 of the analog gate is high, rendering the gate conducting. As a result, capacitor C1 is in shunt across resistor R4, thereby causing the output at terminal 6 of operational amplifier IC2 to be heavily attenuated with increasing frequency, and in particular being heavily attenuated at the ringing signal frequency of twenty hertz. By this means, when a 50 or 100 volt r.m.s. ringing signal is sent through line L34, to appear at input terminal 2 of this element, the passage of these signals will be strongly suppressed. This is esssential to prevent the ringing signal itself from actuating the remainder of the circuit.

When the telephone connected to jack J1 is picked up, thereby effectively grounding line LA through a few hundred ohms, the 5 volt bias supplied to the inverting input terminal 2 of amplifier IC2 through resistor R129 (3 megohms) causes this input to be driven positive, resulting in diode D2 being pulled to a conducting state, turning on transistor Q1, thus turning on transistor Q2, pulling pin 2 of circuit IC4 low, driving output terminal 3 high, turning on transistor Q3, and energizing the relay coil RC, and thereby shifting switch K1 so that terminal T is contacted. Furthermore, with the change of state of the output terminal 3 of circuit IC4, the output control signals on lines L1 and L3 are now reversed, and moreover the analog gate IC1A is closed. As a result, the heavy high frequency roll off characteristic is substantially removed (capacitor C2 being of trivial value for stabilization purposes only) so that this first stage of the circuit becomes substantially responsive at frequencies in the 10 pulse per second range, a necessity if pulse dialing signals are to be passed therethrough subsequently.

Pick-up having occured, voice signals may then be passed via line L34 through switch K1 to signal lines L24 and L32. (See FIG. 3). Additionally dialing tones may also be transmitted therearound. Since transistor Q1 is biased to be saturated in the off-hook condition, dialing tones are not effectively passed through either to transistor Q2 or to the input of inverter IC3B. It should also be noted that the feedback gain of integrated circuit IC2 is substantially less than one at all times, thereby contributing to suppression of propagation of dialing tones through the circuit.

If, on the other hand, pulse dialing is carried out, causing massive signal swings on line LA, then diode D2 will be alternately blocked at a high rate, e.g. 10 pulses per second, these dialing pulses being transferred through transistor Q1 to inverter IC3B to appear on line L28. Although such pulses will cause rapid actuation of transistor Q2 between an on and an off condition, causing these pulses to appear at input terminal 2 of circuit IC4, the timer circuitry is arranged to be retriggerable within a preset timing interval set by resistor R11 (3 megohms) and capacitor C5 (0.1 microfarads). Thus, recalling that in the off-hook condition terminal 2 of timer IC4 is low and transistor Q2 is on, dialing pulses manifest themselves at terminal 2 of IC4 as a series of short releases of the holding action of transistor Q2, during each of which terminal 2 will slowly rise as capacitor C5 is charged via resistor R11. During intermediate periods when Q2 is on, however, this rise is wiped out by rapid discharge via R10 (10 kilohms). Thus, the output of circuit IC4 remains effectively latched throughout the pulse dialing operation. This latching feature is useful in preventing the relay switch K1 from chattering responsively to dialing pulses.

Summarizing, the first hook sensor circuit shown in FIG. 4 produces a 1-0 configuration on the control line pair L1-L3 respectively in the on-hook condition, this configuration reversing when the telephone or answering system connected to jack J1 is off-hook.

Considering next the second hook sensor SHS (FIG. 3), FIG. 5 shows the circuit details of this unit. As shown in FIG. 3, a minus 48 volts potential is applied to the upper active pin of jack J2 via a resistor R122 of nominal value 1.5 kilohms. The second hook sensor must similarly have a provision functionally equivalent to that of the first hook sensor FHS (FIG. 3) for suppressing pulse dialing pulses from the output line L2 so as to prevent these pulses from interfering with the hook sensing signal produced on that line. It will be noted from FIG. 3 that when switch K1 of the switch unit SU is connected to terminal T thereof, i.e. when the unit connected to jack J1 is off-hook, dialing pulses produced at jack J1 will be fed to the second hook sensor SHS via line L32. Thus, dialing pulses from either jack must be suppressed by the second hook sensor SHS.

With reference to the circuit of this unit as shown in FIG. 5, it will be noted that when a unit attached to jack J2 is on-hook the input line L32 is at a potential of minus 48 volts, biasing the base of transistor Q4 off, causing the emitter of transistor Q5, connected to the emitter of Q4 by the biasing string R21, R20, and R19 to bias transistor Q5 to an on-condition, thereby placing the collector thereof and hence output line L2 in a low state. When the unit connected to jack J2 is in an off-hook condition, thereby essentially grounding the base of transistor Q4, this transistor is turned on, transistor Q5 is turned off, and line L2 goes to a high state. The network consisting of resistor R18, the diode D6, and capacitor C8 provide a response time delay sufficient to prevent 10 pulse per second dialing pulses from propagating through to transistor Q5.

Figure 6:
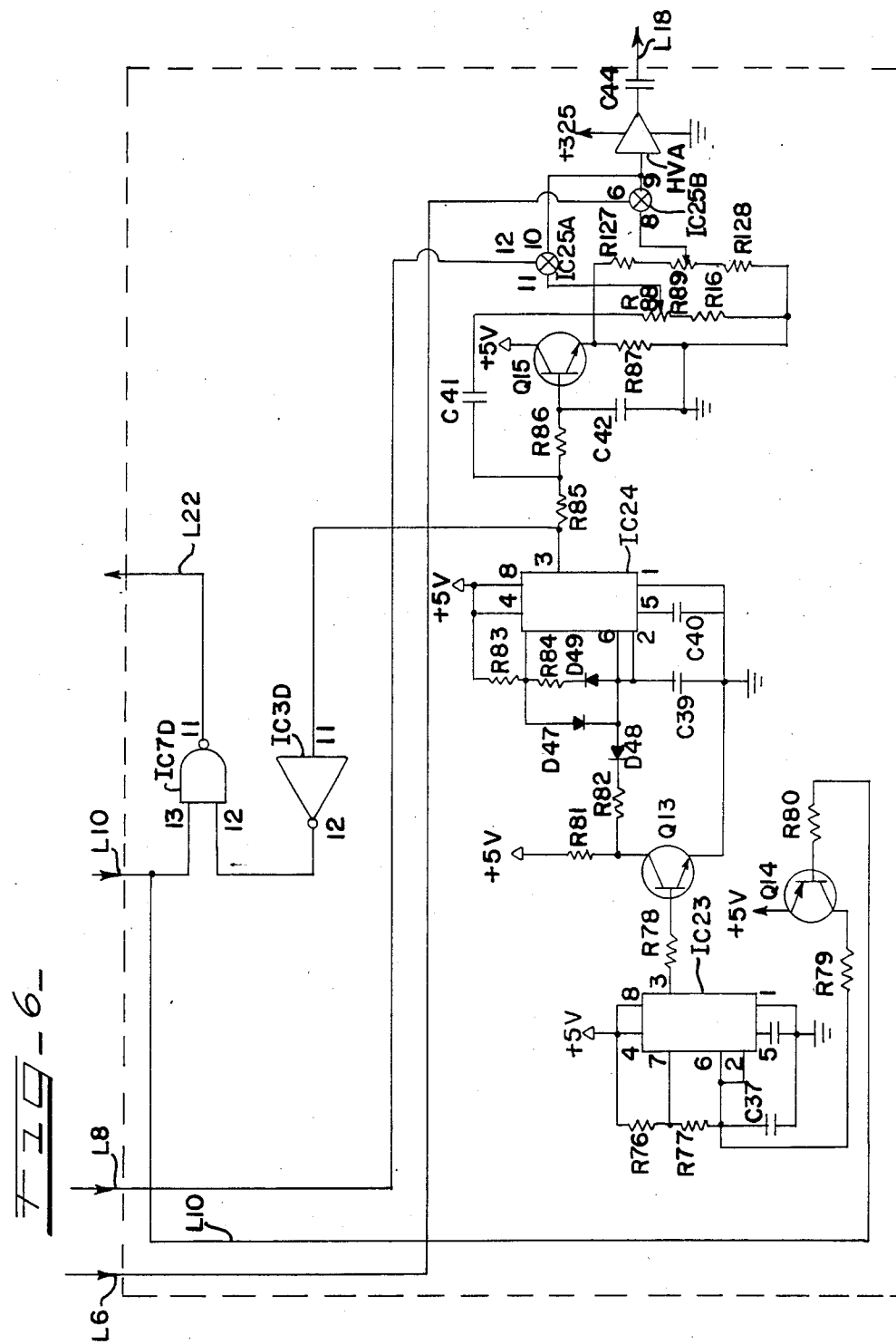
FIG. 6 is a circuit diagram of the ringing generator of FIG. 3.

Considering next the ringing generator RG of FIG. 3, FIG. 6 shows the details of this circuit. It will be recalled that the function of this circuit is to provide a line ringing signal of selectively either 50 volts r.m.s. or 100 volts r.m.s. to line L18, the signal being sinusoidal in the form of a repeated sequence of a one-second duration 20 cycle burst followed by a four second quiet interval. This protocol is in accordance with current United States telephone transmission standards upon which the hook actuators of currently manufactured answering systems are based. The ringing generator is designed to provide these properly timed ringing signals on line L18 for an indefinite period until the apparatus connected to jack J1 goes to an off-hook condition. Additionally, the ringing generator provides this same interrupted signal in square wave form on line L22 to assist in the synthesis of the ringback emulation signal provided by the ringback/dial tone synthesizer RDS shown in FIG. 3.

Circuit IC24 is an astable multivibrator producing a continuous square wave 20 p.p.s. (pulses per second) output signal at pin 3 thereof. Resistors R83 and R84 and diodes D47 and D49 are adjusted to provide a precisely defined 50% duty cycle in the output wave form. Control terminals 6 and 2 of the oscillator are normally free to follow the voltage of C39, allowing the oscillator to run continuously as long as transistor Q13, having its collector driving this terminal via diode D48 and resistor R82, is turned off. As will subsequently be discussed, by turning transistor Q13 on and off every four seconds the oscillator output is converted to one second bursts of 20 cycle square waves with four second quiet periods inbetween.

Transistor Q13 is driven by another astable oscillator or timer using timing circuit IC23 which, when in the free running state, provides at its output terminal 3 a high state for four seconds followed by a low state of one second duration, the cycle repeating indefinitely as long as the control pins 2 and 6 thereof are left free. Free running of IC24 is accomplished by holding transistor Q14, having its collector connected to pins 6 and 2 of IC23, in a conducting state by holding line L10 connected to its base low. Thus, as long as line L10 is held low, the output of terminal 3 of timer IC23 will be low, allowing the 20 p.p.s. oscillator IC24 to free-run.

Immediately upon a 0-1 transition in line L10, the control pins 6 and 2 of timer IC23 are now free to rise in potential at a rate set by the charging network R76, R77, and C37. Output pin 3 will remain in a low state for one second, after which time it will go high for a period of four seconds, the process continuing until terminated by appropriate control signals. From this it may be seen that at the output of oscillator IC24, which is normally in a free running state, a 0-1 transition on line L10 will cause the pulse train at pin 3 of IC24 to continue for one second, followed thereafter by the four second quiet period, and so on. Thus, a proper ringing burst will appear for one second at the output terminal of timer IC 24 immediately upon the previously mentioned 0-1 transition on line L10, this transition being initiated, as previously described, by momentarily contacting either of the switches S1 or S2 of the central control logic CCL of FIG. 3.

Interrupted square wave trains from output terminal 3 of timer IC24 are fed through inverter IC3D, and thence through NAND gate IC7D, and passed therefrom out to line L22, with line L10 selectively controlling transmission thereto. Since the quiescent state of line L10 before initiating ringing is low (by depressing either of the aforementioned switches S1 or S2 of the central control logic CCL), it follows that prior to such depression transmission of the square pulse bursts to line L22 is blocked by gate IC7D. As has been discussed in general terms previously, and as shall be shown in detail subsequently, these square wave bursts on line L22 will be used to emulate ringback synthesis by the ringback-/dial tone synthesizer RDS of FIG. 3.

The conversion of the ringing bursts produced at terminal 3 of timer IC24 to high voltage sinusoids is accomplished first by passing the wave train through an active low pass filter employing transistor Q15. The square pulse bursts are converted to sinusoids at the emitter of transistor Q15 by the filtering action. Two dividers are provided between the emitter of transistor Q15 and ground, namely the pair R88 and R126, and also the pair consisting of R127, R89, and R128. The variable elements R88 and R89 may be manually adjusted to provide the appropriate amplitude at the sliders thereof, and are adjusted for the desired low and normal ring levels, the ratio between the two being approximately two to one. The signal from the slider of potentiometer R88 is passed through the bilateral series switch IC25A when the control electrode 12 thereof is high, i.e. when a high condition is present on line L8. Similarly, R89 passes the signal at the slider thereof, and of about half the value previously produced, through another series bilateral switch IC25B, the signal being transmitted along this branch when line L6 is high.

Thus, three control actions are possible according to the configurations of lines L6 and L8: a 0-0 configuration results in total blockage of ringing signal to the input of the associated high voltage amplifier HVA; a 0-1 configuration passing normal ringing level sinusoidal ringing bursts; and a 1-0 configuration passing sinusoidal ringing bursts of the low ringing level. The high voltage amplifier HVA thus sends out selectively no signal to line L18, a 100 volt r.m.s. ringing signal, or a 50 volt r.m.s. ringing signal. To handle such large signal output swing demands, the high voltage amplifier HVA requires a power supply voltage of 325 volts as shown. Before turning to discussion of the ringback/dial tone synthesizer, it should be noted that in the previously mentioned quiescent state wherein line L10 is in a low condition, i.e. before ringing has been commanded by actuation of the central control logic switches S1 or S2, the continuously running pulse train produced by timer IC24 at terminal 3 will be blocked from passing from line L22 by gate IC7D, and owing to the inverting action of the gate, the quiescent condition of line L22 will be a high state.

Considering next the ringback/dial tone synthesizer RDS of FIG. 3, FIG. 7 shows further details of this circuit, principally in functional form. In this circuit a dial tone is synthesized by adding two sinusoidal wave forms of frequency 352 hertz and 440 hertz respectively. The ringback signal is achieved by modulation of a 440 cycle sinusoidal wave form by the interrupted 20 p.p.s. square wave form bursts produced on line L22 and provided by the previously discussed ringing generator.

In more detail, an astable multivibrator oscillator O producing a square wave form of 10.560 kilohertz frequency drives a divide-by-twenty-four divider D1, as well as a divide-by-thirty divider D2, both dividers being followed by low-pass filters F1 and F2 respectively to remove the higher harmonics of the wave forms. The two resulting sinusoids may be optionally combined through two bilateral switches BS1, BS2 by positive control signals applied thereto, the composite waveform being passed through a low-pass filter F3 and capacitor C19 to line L24. A high signal applied to line L16 will close bilateral switch BS2 to feed the 352 cycle sinusoid to the filter F3. The same signal condition will result in a low state at the output of the exclusive-OR gate IC6D, thus placing the output of the NAND gate IC7C high irrespective of the signal conditions on line L22, thereby enabling the bilateral switch BS1 at will.

Thus, with line L16 in a high state both bilateral switches BS1 and BS2 are closed, and a dial tone synthesis is achieved. If, on the other hand, line L16 is supplied with a low state by the central control logic, then the bilaterial switch BS2 is disabled, a high state is produced at the output of gate IC6D activating gate IC7C to a signal-passing condition, resulting in 20 cycle burst modulation of the 440 p.p.s. signal passing through gate BS1, the resulting output on line L24 being now an emulation of the waveform produced by a telephone central office to inform the calling party that the receiving phone is being rung, i.e. a "ringback" signal.

FIG. 8a shows in functional form the central features of the dialing display readout system DDR of FIG. 3. It will be recalled that the function of this unit is to accept either dialing tones via line L24 or dialing pulses via line L28 and to output them sequentially to a single character display DS1 at a rate no greater than 2 digits per second, so that proper operation of high speed dialing systems may be observed. To this end, dialing tones representing corresponding digits are converted by a tone converter TC, the output of the converter representing in binary form the digit corresponding to the particular tone combination received. These tone combinations are nationally standardized and a converter for accomplishing such a purpose, namely TC, is commercially available in a single integrated circuit as indicated in Table 1. This binary representation of the digit is supplied to digit input terminals DDDD of a queuing register QR. Alternatively, dialing pulses received via line L28 are converted to a binary representation by simple four-stage up-counter PC, the binary number presented at the four output terminals thereof representing the pulse count. The output from the pulse counter PC is also transmitted to the queuing register data input terminals DDDD.

The queuing register QR is of the FIFO (first-in, first-out) type. Such registers have the property that a binary string clocked into the data input terminals, e.g. DDDD, are quickly passed towards the output terminals 0000. The queuing register QR is capable of storing up to sixteen four-bit binary numbers in a queue, so that the first number entered into a cleared register having nothing in storage is advanced virtually immediately to the output terminals, a next number so entered proceeds to a storage stage immediately prior to the output stage, and so on. Thus, each time a new number is entered, its 4-bit binary number representation is virtually immediately stored in the last unfilled storage location closest to the output terminals. Application of a strobing pulse from a display output clock DC to terminal S causes the 4-bit number stored first to be sent to a decoder DEC along lines Q0-Q3, whereupon all the numbers still in storage advance along the queue.

Thus, the digits corresponding to high speed dialing pulses or tones are stored in the queuing register QR to be strobed out to a decoder DEC for display in the display element DS1 at a rate set by the pulsing rate of the display output clock DC, such rate being chosen in the present system to be approximately twice per second so as to enable the operator to observe the action of the system. Such an approach represents a substantial improvement from a cost standpoint over the approach used in the previously mentioned Conway instrument, which employs a relatively expensive 12-digit display and a microprocessor based system to control its actuation. By means of a relatively inexpensive queuing register strobed at an adequately low rate, the same function can be achieved at greatly reduced cost.

The decoder DEC may take a variety of forms; however, in the preferred form it is arranged to cause the lower horizontal element bar LH of the display element DS1 to appear responsive to pressing the "#" button when that dial tone is received, and to light the decimal point D when the "*" button is tested. Such decoding may be accomplished by a variety of means well-known in the art.

A register control logic RCL is used to control the clocking of data into the queuing register QR at terminal C thereof, to clear the queuing register by a signal at terminal R to output a "0" to the display element DS1 prior to initiation of the dialing sequence, and to establish a signal condition on line L20 to the central control logic responsive to receipt of the first dial tone or dialing pulse so as to turn off the dial tone, in emulation of normal telephone systems A momentary 0-1 signal transition is placed on line L36 upon the depression of the reset button of the central control logic CCL (FIG. 3), this transition causing the register control logic RCL to clear and reset the dialing pulse counter PC and the queuing register QR.

The display output clock DC is not a free-running unit, but is in fact a pulser sending one output pulse to terminal S of the queuing register QR upon receipt of a sensing signal from terminal A thereof. The sensing terminal A will be in a low state in a cleared register, i.e. in an empty register, and will go to a high state whenever a stored 4-digit binary number is present at the output ready for transmission to the decoder DEC. The display output clock DC will continue to strobe digits from the output terminal 0000 of the queuing register QR at a 2 strobe per second rate until the last stored binary number has been strobed.

The particular register used, namely the RCA type CD 40105 has the property that the last number remaining in the queuing register is not wiped out by the strobing operation, but remains present on the output terminals 0000 until another number is entered at terminals DDDD. Thus, the particular queuing register employed in the present invention has a latching feature with respect to the final remaining number, as a result of which no separate latch must be provided between the output stages and the decoder DEC. Without such a feature, the digits appearing at DS1 would be of transient appearance too short to be readily observed, or might display unintentional digits.

If alternatively a queuing register is employed not having such a latching feature at the output stage, the decoder latch itself may be used for such purposes by use of an appropriately timed signal sent from the display output clock DC to the latch enable terminal LE via a separately dedicated line LL as symbolically indicated in FIG. 8A.

Considering now the details of the dialing display readout system shown in FIG. 8B, the queuing register IC16 has the following properties with respect to its various control terminals. The register will be cleared and reset whenever pin 9 is high; input data will be entered into the register via terminals 4-7 whenever terminal 3 goes through a 0-1 transition; and terminal 14 will be in a high state whenever there is a number stored in the output stage ready to be sent out via terminals 10-13 on lines Q0-Q3; and this output shift will occur whenever terminal 15 undergoes a 1-0 transition. Furthermore, it will be recalled that the pulse dialing line L28 is in a low state when the telephone plugged into jack J1 is on-hook. Clocking signal control to terminal 3 is secured via terminal 11 of the exclusive-OR gate IC14D connected thereto via resistor R123. Terminal 12 of this gate is held low initially through resistors R68 and R64. Transistor Q11 is used principally for noise-suppression purposes when the telephone is on hook and prevents spurious clocking pulses from reaching terminal 12 of gate IC14D, having its collector connected to terminal 12 of gate IC14D and its emitter grounded.

As will subsequently be shown when the details of the central control logic CCL of FIG. 3 are discussed, pushing on the the reset switch S1 thereof suppresses the dial tone and causes a pull-down of line L36 to a low state as long as this switch is held in a contacting position. The immediate result of this is to cause a high signal condition to exist at the output of inverter IC3E having its input connected to this line, this high state being transmitted to capacitor C20 to the reset terminal 9 to cause a clearing to occur within the register of IC16.

It will be noted that a resistor R55 is connected to ground to provide a bleed-down of the charge stored in capacitor C20, R55 typically having a value of 100 kilohms and capacitor C20 having a typical value of 0.05 microfarads. The time constant of this network is short, with the result that within a matter of miliseconds after the switch 81 has been pushed into closure and held there, the resulting pulse on terminal 9 decays, and the register IC16 is ready thereafter to accept input data. This closure, however, has had the effect of placing a 1-0 transistor on the clock terminal 3 of IC16, which has no effect; however, upon release of switch S1 a 1-0 transition occurs at terminal 3 to clock whatever data is initially present in input terminals 4–7 of the register IC16, so as to enter this data and present it immediately at the output stage terminals 10–13 for strobing to the display element DS1. It will be shortly be shown that this initial state is a low condition on input terminals 4–7, as a result of which a "0" is strobed out to the display. Thus, closing and releasing switch S1 of the central control logic causes a 0 to be sent to this display and clears the register IC16.

Turning next to the details of the data display register circuit elements, FIG. 8B shows all circuits shown functionally in FIG. 8A, with the exception of the decoder DFC and the display element DS1. Circuit IC16 is to be formally identified with the queuing register QR of FIG. 8A, circuit IC19B is to be identified with the display output clock DC, circuit IC17 performs the functions of the tone converter TC, circuit IC18 performs the function of the dialing pulse counter PC, the remaining circuitry consisting of a retriggerable multivibrator IC19A, exclusive-OR gate IC14D, inverter IC3E, and associated discrete components connected thereto, are to be associated with he register control logic RCL.

The queuing register QR has the protocol that the numbers stored in the last stage will be strobed out to lines Q0–Q3 upon a 0-1 transition at the strobing terminal 15 thereof. The presence of valid data in this stage ready for strobing is indicated by a high state at the availability terminal 14. Input data presented at input terminals 4–7 are clocked into the register to be transported rapidly thereacross to the last available location near the output by a 1-0 transition at the clock terminal 3. All stages of the register IC16 may be simulaneously cleared by a high state applied to a reset terminal pin 9 thereof.

Deferring for the moment details of the manner in which data is entered at terminals 4–7, and considering first the manner in which data is strobed out of the last stage of IC16 to the data output lines Q0–Q3 for decoding and display (see FIG. 8a), circuit IC19B is a one-shot multivibrator arranged to have its output terminal 10 low in the quiescent or dormant state. A 0-1 transition applied to trigger input terminal 12 will cause the multivibrator circuit to execute one cycle of approximately one-half second duration, as determined by the time constant of capacitor C29 and resistor R71. Thus, arrival of a stored digit in the last stage of the queuing register QR causes terminal 14 thereof to go high, thereby releasing terminal 12 from its low state to which it was pulled via diode 12 and resistor R70. Since terminal 12 of IC19B is also connected to a relatively high resistance R74, release of this pull-down at terminal 12 causes this terminal to be driven quickly positive because of the high condition at terminal 9. The multivibrator then executes a complete cycle wherein terminal 10 first goes to a high state, then to a low state, and during this latter transistion actuates terminal 15 of the register IC16 to strobe the stored digit out in a parallel representation to output lines Q0–Q3 via terminals 13–10.

At the end of this operation terminal 9 of the multivibrator IC19B is again high, and a second strobing operation will occur as soon as terminal 14 of the register IC16 again goes high to announce the presence of stored digit ready for output. The register IC16 and clock IC19B will output data sent in slow dialing via the input terminals 4–7 at a rate approximately equal to the arrival rate at the input terminals, whereas under high speed data input condition digits will be sent out via terminals 10–13 at a maximum rate of approxiately two digits per second.

Again it should be noted that the particular form of queuing register IC16 used (see Table I) retains the numbers stored in the last stage constantly presented to the output terminals 10–13 so long as it is the last remaining stored number in the system. Thus, latch enabling via the optional line LL shown in FIG. 8a is not necessary with this particular unit, the last digit in storage remaining constantly displayed until replaced by another.

Turning next to the details of data entry into the queuing register IC16, the control line protocols with the tested unit connected to input jack J1 (FIG. 3) and in an off-hook condition are as follows: control line L28 idles low; control line L36 idles in a high state; in the absence of input tone dialing pulses terminals 1, 16–18 of the tone converter IC17 are in a low state; the strobing clock IC19B is disabled, since no data is stored in the last stage to cause pin 14 of circuit IC16 to be in a high state; and as will subsequently be shown the output terminals 3–6 of the 4-stage binary counter IC18 are similarly in a low state. Since the tone converter IC17 and the dialing pulse counter IC18 are connected to input terminals 4–7 of the queuing register IC16 through steering diodes D13–D16 and D17–D20 respectively, in a quiescent state a low signal condition is presented to terminals 4–7 of IC16. With particular reference to the exclusive-OR gate IC14D, since line L36 idles in a high state and since pin 12 of this gate is connected to ground through resistor R64, it thus follows that the output pin 11 of gate IC14D idles in a high state, outputting this condition to control line L20 to the central control logic CCL shown in FIG. 3.

The dialing test is initiated with the telephone connected to input jack J1 of FIG. 3 off-hook, whereupon reset switch S1 of the central control logic CCL of FIG. 3 is to be momentarily pushed into contact. As will subsequently be shown, this has the immediate effect of suppressing the dial tone, as well as causing an immediate pull-down of line L36 from its normal high state to a momentary low state.

Additionally, the result of momentarily contacting switch S1 is to place a momentary 1-0 transition to the input of inverter IC3E, resulting in a positive clearing pulse being applied to the reset terminal 9 of the queuing register IC16. This register is thus instantaneously cleared. Immediately before this pull-down of line L36, terminal 12 of gate IC14D was low, and terminal 13 was high, resulting in a high state being supplied to the clock terminal 3 of the queuing register IC16. The momentary pull-down of line L36 causes the reset signal condition to appear at terminal 9 of the queuing register IC16; however, at a time very shortly thereafter set by the decay time of the network consisting of capacitor C20 and R55 this reset condition is released, allowing the register to accept clocking and strobing signals. Thus, the momentary pull-down of line L36 immediately clears and releases the queuing register IC16. The momentary pull-down of Line L36 causes a 1-0 transition at the clock terminal 3 of register IC16, which has no effect. Upon release of this condition by releasing pressure on switch S1, however, a 0-1 transition is transmitted via gate IC14D to clock terminal 3 of the register IC16 to cause the data present at terminals 4-7 of register IC16 to be clocked in as a binary number. As has been previously stated, in the quiescent state this is a 0 condition on all four lines, as a result of which by mechanisms previously described a 0 digit is rippled through the register IC16 to be automatically strobed out on lines Q0-Q3 to the display element DS1 of FIG. 3, to remain there as a visual indication that this system is in readiness to accept subsequent dialing pulses. The system is now configured to receive either tone or dialing pulses and to output them to the display element DS1 (FIG. 3) at a moderate rate of speed.

With the queuing register IC16 cleared by the momentary reset operation and presenting a 0 in the display register DS1, the system is ready to accept dialing pulse or dialing tone information. It should be noted at the outset that with switch S1 released to an open-circuit condition, line L36 is again in a high state, as a result of which gate IC14D serves throughout the remainder of the dialing process as a simple inverter with respect to signals applied to terminal 12 thereof.

Tone dialing will next be considered. The tone dialing converter IC17 has a "data valid" terminal 14 associated therewith, this terminal going high upon receipt upon a recognizable tone combination indicative of a dialed digit, and thereby indicating that a binary representation of the dialed number is available at the output terminals 1, 16-18.

Upon the transmission of the first tone corresponding to the first digital button pushed in the telephone connected to jack J1 (FIG. 3), a representation of the digit corresponding thereto is very quickly outputted to the output terminals 1, 16-18 of the decoder IC17 and thence to the input terminals 4-7 of the queuing register IC16 via the isolation diodes D13-D16. Virtually immediately upon presentation of this signal condition, the "data valid" terminal 14 of circuit IC17 undergoes a 0-1 transition, outputting this signal condition to diode D23 to charge capacitor C27 (0.0047 microfarads), charging this capacitor through diode D25 and resistor R64 connected to ground. As a result of this 0-1 transition, a 0-1 signal condition is established at the output point of resistor R64 to be transmitted to terminal 12 of gate IC14D, resulting in a 1-0 transition at the clocking terminal 3 of the queuing register IC16, which has no effect. However, maintaining this condition gives to subsequent discharge via diodes D24, capacitor C27, and resistor R63, giving rise to a 1-0 transition in a matter of an order of 1 millisecond, as set by the time constant established by capacitor C27 and on R64. This sag results in a 0-1 transition at terminal 12 of gate IC14D, which, acting now as an inverter converts the signal to a 0-1 transition at terminal 3 of the queuing register IC16D. This results in the clocking in of the data presenting to terminals 4-7 thereof to be transferred to the output stage, and thereafter to be strobed to the outplay display DS1 (FIG. 3) as a result of immediate activation of the clock circuit centered upon circuit IC19B. The output of IC14D also provides a signal on line L20, which cancels dial tone upon the first dialed tone if not previously cancelled by the reset switch S1.

Upon termination of the transmitted digit tone the data valid terminal 14 of IC17 undergoes a 1-0 transition, resulting in a rapid bleed-down in the charge of capacitor C27 via the network consisting of resistor R63 and diode D24, as a result of which no substantial signal is developed across resistor R64, and no pulses are transmitted to gate IC14D. Thus, one single tone chord indicative of a given dialing digit has been placed in the register IC16 for subsequent strobing thereout to the display element DS1. Subsequent pulse tone transmissions are handled in a similar way, resulting a seriatim display of the tone-dialed digits transmitted to the register display system.

In the case of pulse dialing, line L28 idles in a low state and is momentarily pulled high by the dialing pulses. These pulses are passed through a retriggerable one-shot multivibrator IC19A which in its dormant state has its conjugate output at terminal 7 high. The reset terminal 7 of the 4-stage pulse counter IC18 is normally held high via resistor R62 and is thus held in a constant cleared condition until terminal 7 of the multivibrator IC19A goes low, i.e. during the active period of the multivibrator after receipt of a dialing pulse at terminal 4 thereof. The reversion time of the multivibrator is set by resistor R66 and capacitor C25. These values are adjusted such that a multivibrator output of terminal 7 will remain in a low state for approximately one quarter second after the last triggering pulse is received. This element is of the retriggerable type, in that a second pulse received within such a one quarter second interval will extend the reset time an additional one quarter second.

As a result of this, the leading edge of the first received dialing pulse of a string of such pulses drives terminal 7 low, this terminal remaining low until approximately one-fourth second after the last pulse of the string has been received, after which time the multivibrator resets, thereby allowing the counter IC18 to reset and clear the stored count. This reset time requires an additional delay set by the charging time of the network consisting of resistor R62 and capacitor C23, which is chosen to be of the order of 10 milliseconds.

Thus, the leading edge of the first pulse of the dialing pulse string immediately releases the cleared condition in the counter IC18, entry of the leading edge of this first pulse into the counter being slightly delayed by the time constant of the network consisting of resistor R61 and capacitor C22. This ensures proper capture of the first pulse by the counter.

At the end of the dialing pulse string corresponding to a given dialing digit, the number is in storage in the counter IC18, a binary representation of this count being fed to data terminals 4-7 of the queuing register IC16 via isolation diodes D17-D20. Approximately one-fourth second after the last pulse of the digit-representing pulse string, output terminal 7 of the multivibrator IC19A goes high, immediately sending a pulse to a diode-steered charging network consisting of resistors R64 and R65 and capacitor C28, and functioning in the same manner as the previously described tone dialing network to provide an input clocking pulse to input terminal 3 of the queuing register IC16 as before. The network consisting of resistor R62 and C23 is provided at the reset terminal at the counter IC18 to ensure that this unit does not reset and clear the stored number before it has been properly strobed into the queuing register IC16.

Transistor Q11 serves as a noise-suppression clamp on the clocking line to terminal 12 of gate IC14D. With the telephone on-hook line L28 is high, turning on transistor Q11 and preventing spurious stray signals from clocking the register IC16. During tone dialing, with the test unit off-hook, line 28 is how, turning off transistor Q11 and thus allowing clocking pulses to pass. In pulse dialing, during the individual pulse dialing pulses Q11 repeatedly conducts; however, upon the disappearance of the last dialing pulse of a given string transistor Q11 is turned off. The clocking pulse generated shortly thereafter by a change of state at terminal 7 of timer IC19A is thus freely passed to gate IC14D.

Considering next the details of the central control logic CCL of FIG. 3, as shown in the detailed circuit diagram of FIG. 9, the basic functions of this circuit will now be recapitulated: A properly coded 0-1 or 1-0 signal condition must be established on lines L8 and L10, respectively, responsive to momentary contact of the reset/low switch S1, or the normal (loud) switch S2. Simultaneously with contacting of either switch, an appropriate 0-1 transition of line L10 is provided to initiate proper synchronization of the ringing generator. The system must provide a dial tone by providing a high state on line L16 responsive to pick-up of either of the telephones connected to jacks J1 and J2, and further must disable this dial tone responsive to either depression of the reset switch S1 into momentary contact, or responsive to pick-up of whatever second telephone is connected to either jack J1 or jack J2.

Considering the subcircuits of FIG. 9, there are three central bistable circuits that must be considered in detail. First, circuits IC5A and IC5C constitute a reset flip-flop, as do circuits IC5B and IC5D. Both of these circuits are set so that on power-up, i.e. when power is initially turned on to the system, and with the unit connected to jack J1 on-hook, thereby enabling gates IC5C and IC5B, these respective flip-flops are set so that initially both input pins of gates IC5A and IC5B are in a high state. As a result of this, input terminals 5 and 6 of circuit IC6B are in a simultaneous high state, resulting in a low state at the output thereof, circuit IC6B being an exclusive-OR gate. This initial condition is ensured by the presence of a high state on line L1 to terminals 8 of gate IC5C and terminal 12 of gate IC5D, as well as by the pull-up action of resistors R23 and R24 to terminals 2 and 6 of gates IC5A and IC5B respectively. Although capacitor C5 from FIG. 4 is initially discharged, which causes IC4 pin 3 and line L3 to be high and thus line L1 to be low, this condition reverses in a matter of milliseconds as capacitor C5 causes a 0-1 transition at IC4, pins 2 and 6. As a result of this, a low state is outputted to lines L6 and L8 (FIG. 3), thereby disabling bilateral switches IC25A and IC25B (FIG. 6) so as to suppress transmission of a ringing signal to line L18. Thus, on power-up, no ringing signal is enabled.

Additionally, it will be noted that the dial tone control line L16 is driven by a pair of cross-coupled NAND gates IC7A and IC7B, the input terminals 1 and 6 of these gates being held by a high state in the absence of external signals applied thereto. As a result of this, line L16 may be either in a high or low state, according to the triggering sequence applied to the input terminals 1 and 6. On power-up with both telephones in an onhook condition as evidenced by a low-state on lines L2 and L3, a low state is present at pin 12 of exclusive-OR gate IC6C, and additionally a low state is created at terminal 13 thereof because of the previously mentioned 0-0 condition at input terminals 5 and 6 of exclusive-OR gate IC6B. Thus, terminal 6 of NAND gate IC7B is held low during the power-up condition.

In this quiescent state terminal 1 of NAND gate IC7A is held in a high state by the bias applied through resistor R26. As may be readily verified, the result is that the output line L16 is initially in a low state, causing to an inhibition of the ringback/dial tone synthesizer RDS (FIG. 3). It should further be recognized, however, that since terminal 1 of gate IC7A is normally held high, and can only be driven momentarily low through signals derived through inverter IC3C and capacitor C9, then in the absence of any such pull-down of terminal 1 of gate IC7A, the effect of pulling down line L40 at any point, thereby pulling terminal 6 of gate IC7B down, will be to revert the state of line L16 to a low state, thereby inhibiting the dial tone. This feature will be of significance in discussing subsequent operations of this system.

Returning now the two reset flip-flops IC5A and IC5C, and IC5B and IC5D, it may be readily verified that after the power-up condition, depression of either of the switches S1 or S2 will cause a latching condition at the outputs thereof. Thus, a momentarily closing switch S1 causes input terminal 2 of gate IC5A to be pulled low, thereby causing a latching inversion of this circuit to place a high state on line L6. This same actuation, however, causes an immediate actuation of line L10 to a high state, lines L6 and L10 remaining thereafter latched in this condition to provide the low-signal ringing condition on lines L6 and L10 actuating the ringing generator RG (FIG. 6). This causes a high voltage ringing signal as previously described to be sent along line L18 to the unit connected to jack J1. Alternatively, had switch S2 been momentarily contacted instead, a high voltage ringing signal configure would have been outputted to lines L8 and L10 to provide the high voltage ringing signal to the switch unit SU (FIG. 3).

As a result of the initial selection of low or high ringing selection, depression of switch S1 or S2, terminal 3 of gate IC5A and terminal 4 of gate IC5B will be alternatively in a 1-0 or 0-1 configuration respectively. Thus, so long as the unit connected to jack J1 is on-hook, thereby holding line L1 high and with either IC5C, pin 9 high or IC5D, pin 13 high it follows that terminals 5 and 6 of the exclusive-OR gate IC6B are either in a 1-0 or 0-1 configuration respectively, thereby placing the output terminal 4 thereof in a high state, thereby applying a high signal condition to input terminal 13 of gate IC6C. Subsequent pick-up of the telephone connected to jack J1 causes line L1 to undergo a 1-0 transition, thereby immediately placing terminals 5 and 6 of gate IC6B in a high state, thereby holding input terminal 13 of gate IC6C in a low state. As a result of such pick-up, however, terminal 2 of gate IC6A undergoes a 0-1 transition, whereas terminal 1 thereof remains in a low state, resulting in a high state at the output of this element, this 0-1 transition being inverted to a 1-0 transition coupled momentarily through capacitor C9 to input terminal 1 of gate IC7A. Thus, input terminal 1 of gate IC7A is momentarily pulled low, and the disabling of gates IC5C and IC5D resulted in a low level condition applied to terminal 13 of gate IC6C and a high state provided to terminal 12 thereof via gate IC6A, terminal 6 of gate IC7B is latched low. Additionally terminal 1 of gate IC7A thereof undergoes a 1-0-1 transition as the pulse applied thereto via capacitor C9 responds initially to the line condition at the output of gate IC6A, and thereafter bleeds off. As a result of this, the cross-coupled gate circuit IC7A/IC7B causes the output state of line L16 to drop to a low state, thereby disabling the dial tone. Thus, momentary depression of either of the switches S1 or S2 not only sets the high or low coding signal condition to the ringing generator RG (FIG. 3), but also causes a disabling signal on line L16 to the ringback/dial tone synthesizer RDS (FIG. 3).

It should further be recognized that should the user have failed to reset the circuit by momentary depression of switch S1, that any subsequent pull-down of line L40 will cause of the state of line L16 to revert from a high to a low state, thereby disabling the dial tone. This feature is incorporated so that initiation of the first dialing pulse will disable the dial tone even in the absence of such reset operation by a pull down on line L20 sent out from the dialing display readout system DDR (FIGS. 3 and 8b).

It will therefore be recognized that, having configured the system to the initial power-up configuration by turning on the power thereto, followed by actuation of either of the switch S1 or S2 to provide a low or high ringing voltage to the telephone equipment connected to jack J1, thereafter followed by a pick up of this unit, the dial tone is disabled, and the apparatus is configured for the dialing test. Further, with either instrument off-hook and attached to jacks J1 or J2, depression of switch S1 will invariably disable the dial tone to allow testing for voice level using level detector circuit LD (See FIG. 3). Moreover, with the dial tone actuated by the presence of a high state on line L16 and with one unit off-hook, a pick-up condition of the other unit will invariably suppress the dial tone by placing a simultaneously 1-1 condition on terminals 1 and 2 of gate IC6A, thereby placing a low state at the output terminal 3 thereof and to input terminal 12 of exclusive-OR gate IC6C, thus simultaneously disabling gates IC5C and IC5D by placing a low state at terminals 8 and 12 thereof respectively, the line L1 thereby placing a 1-1 configuration at the inputs pins 5 and 6 of gate IC6B, resulting in a low state at terminal 13 of gate IC6C, the net result of which is to place terminal 11 of gate IC6C low, and therefore terminal 6 of IC7B low, while at the same time releasing terminal 1 of gate IC7A to a high state because of R26, again toggling the pair IC-7A/IC7E to place a low state on line L16 to disable the ringback/dial tone synthesizer RDS of FIG. 3. By this means, normal telephone conversation can be carried on between the units connected to jacks J1 and J2.

Considering finally the line cord tester, FIG. 10 shows the details of this circuit as applied to a test cord having plugs P4 and P5 connected to jacks J4 and J5 respectively. Two pairs of plug-in jacks are provided, namely the pair J6 and J7 and the pair J4 and J5. These jacks are configured respectively to receive either the handset cord or the wall cord previously described. These circuit details are identical with respect to both pairs of jacks, and the discussion to follow will concern itself solely with testing of a line cord connected via plugs P4 and P5 to test jacks J4 and J5 respectively via the interconnecting lines L1–L4 connected to terminals 1–4 of each of the aforementioned jacks respectively.

Two sets of light-emitting diodes D51 and D52 are provided respectively to test for the lines interconnecting terminals 2 and 3 and 1 and 4 respectively of the jacks and plugs J4–P4 and J5–P5. Considering first the status of lines L2 and L3 interconnecting jacks J4 and J5, it will be seen with reference to the circuit of FIG. 10 that a continuous and non-shorting line pair L2 and L3 will cause system voltage applied via resistor R120 to be supplied from jack J4 via line L2 to the anode of the light-emitting diode L5, the return circuit being completed via line L3 to ground at jack J4 as shown. Thus, line continuity of the pair L2–L3 is indicated by illumination of the diode D51 when the plugs P4 and P5 are inserted into their corresponding jacks J4 and J5 respectively. Also, a short-circuit condition between these two lines will short out diode D51 resulting in no illumination thereof. Similarly, an open-circuit condition in either of these lines will also cause this diode to fail to illuminate. Thus, either an open-circuit in either of these two lines, or conversely a short-circuit condition therebetween will cause a failure of the diode D51 to light up, thereby indicating a breakage or short-circuit failure within the cord under test. Similar considerations apply to the testing of cord elements L1 and L4 as evidenced by illumination of or the failure to illuminate of diode D52. By this means proper functioning of the two lines pairs constituting the elements of a handset cord or a receiver cord may be tested.

Moreover, it should be recognized that should the connectivity of, for example, plug P5 be reversed with respect to that of plug P4, thereby reversing lines L2 and L3 so as to contact terminals 3 and 2 of plug P5 respectively, a reversed polarity will be applied to diode D51, as a result of which diode D51 will fail to illuminate. Thus, not only is there provided a short- or open-circuit test for each of the line pairs L2–L3, and L1–L4, but a specific test is provided to detect their accidental reversal in manufacture. This is of substantial significance to the user, since he is not particularly interested in the diagnosis of which line is shorted to which other line, or alternatively which line is open-circuited, but he merely wishes to know whether the line is in proper operating condition or not. To the applicant's knowledge, no previous cord testing circuit provides for this feature.

While the invention has been described with reference to a preferred embodiment, it will be understood by those skilled in the art that various changes may be made and equivalents may be substituted for elements thereof in the disclosed embodiment of the invention without departing from the broader aspects thereof.

I claim:

1. In a plug-in telephone tester for connection to a telephone so as to test for erroneous digit-indicating dialing signals produced when manually or automatically dialing said telephone and having connector means for receiving a plug-in connector of a manual or automatically dialable telephone, a single digit indicating display element, and control means for operating said display element to display a number corresponding to each numerical digit-indicating signal received by said connector means, the improvement wherein said control means includes: first means for receiving and storing in time sequence the dialed digit-indicating signals in different storage areas thereof provided for the respective numerical digits as they are received by said connector means at possible speeds where they cannot be discerned when sequentially viewed on said display element; and second means responsive to the presence of digit-indicating signals stored in said first means for sequentially reading out the digit-indicating signals stored in said different storage areas to said signal display element to display the numerical digits involved sequentially at a slower readily visible sequential rate.

2. In a plug-in telephone tester for connection to a telephone so as to test for erroneous digit-indicating dialing signals produced when manually or automatically dialing said telephone and having connector means for receiving a plug-in connector of a manual or automatically dialable telephone, a single digit indicating display element, and means for communicating to said display element a number corresponding to each numerical digit-indicating signal produced by dialing said telephone, the improvement comprising: first means for receiving and storing the dialed digit-indicating signals as they are sequentially generated; and second means for sequentially reading out the stored digit-indicating signals to said single display element at a relatively slow readily visible rate, and wherein said first means includes means for converting each of said digit-indicating signals to a multi-bit binary electrical signal representing the digit involved, and queuing shift register means having input terminal means for receiving said binary signals, said shift register storing a plurality of said binary signals in a plurality of serially connected multi-bit storage stages including a last or output stage, each such stage being capable of storing one of said binary signal representations, said register means when empty transferring a representation subsequently presented at the register input automatically to said output stage and transferring subsequently received representations to adjacent stages so that the order of storage in said serial stages represents the order of receipt thereof, said register means presenting an electrical representation of the contents of said last stage to register output terminal means, said register having sensing terminal means and providing thereat a signal condition indicative of the presence of a number in storage in said output stage, said register means having control terminal means and acting in response to a strobbing signal applied thereto to advance collectively the contents of each said stage to its neighboring stage in a direction towards said outputs stage so that a series of said strobbing pulses advances the register contents to output the contents of each stage in an order of initial receipt, said tester including means for coupling the representation produced by said converting means to said input terminals of said register means;
   strobing pulse generating means coupled to said sensing and control terminal means for providing a strobing pulse to said control terminal responsive to a signal produced by said sensing terminal means indicative of the presence of a stored number in said output stage, said pulse generating means including timing means for controlling the time between successive pulses to be no less than chosen value; and
   means for providing in said display element a human readable number corresponding to the number indicated by the binary data stored in said output stage at a given time.

3. The system of claim 2 wherein said chosen minimum time between strobing pulses is no less than approximately one-half second.

4. A testing system for testing electronic plug-in telephones or the like deriving their power from telephone lines to which they are connected and having steering diodes associated therewith for providing an operating voltage or proper polarity irrespective of line voltage polarity, said system comprising:
   input connector means for receiving a plug-in connector of the telephone under test;
   means for providing a d.c. voltage to said input connector means to power said equipment for test purposes;
   means for providing an audible signal to said input connector means; and
   polarity reversing means including a reversing switch for selectively providing said direct voltage in either polarity to said unit so that proper reception of said audible signal with said switch in either position is indicative of proper functioning of said diodes.

5. A testing system for testing telephone equipment comprising:
   input connector means for receiving the plug-in connector of the equipment under test;
   means for providing at least two substantially different ringing signal voltages; and
   manually actuatable control means for selecting a chosen ringing voltage value and feeding the same to said input connector means.

6. A testing system for testing telephone answering equipment comprising:
   first input connector means for receiving a plug-in connector of the equipment under test;
   manually operable ringing means;
   means responsive to the operation of said manually operable ringing means for producing a continuous train of predetermined timed ringing voltage bursts and feeding them to said first connector means; and
   means responsive to actuation of said answering equipment to a telephone off-hook simulated condition for terminating said ringing voltage.

7. The testing system of claim 6 further comprising:
   second connector means for connecting a monitor telephone to said system;
   means for providing a ringback signal to said monitor telephone when so connected and in an off-hook condition during production of said ringing signals;
   means for suppressing said ringback signal when said answering equipment is actuated to an off-hook condition and for thereafter establishing voice communication between said equipment and said monitor telephone; and
   means for automatically supplying a dial tone to one of said equipment and said telephone thereafter when the other is actuated to an on-hook condition.

8. The testing system of claim 6 further comprising means for visual monitoring of transmitted voice level from the unit under test.

9. The testing system of claim 6 further including a single digit indicating display element, means for communicating to said display element a number corresponding to each numerical digit-indicating signal produced by dialing the unit under test, first means for receiving and storing the dialed digit-indicating signals as they are sequentially generated, and second means for automatically sequentially reading out the stored digit-indicating signals to said single display element at a slow readily visible rate.

10. The testing system of claim 6 further including means for providing at least two substantially different ringing signal voltages; and manually actuatable control means for selecting a chosen ringing voltage value and feeding the same to said imput connector means.

11. A telephone cord test circuit for testing telephone cords having first, second, third, and fourth wires connected respectively to first, second, third and fourth terminals of first and second plug connectors respectively, said circuit including a first jack configured for contactingly receiving said first plug connector at first, second, third, and fourth terminals thereof respectively and a second jack configured for contactingly receiving said second plug at first, second, third, and fourth terminals respectively, a pair of voltage supply means for supplying an independent positive voltage above ground to said first and second terminals of said first jack means, conducting means grounding said third and fourth terminals of said first jack means; first unidirectionally conducting indicating means having one terminal connected to said second terminal of said second jack means and its other terminal to said third terminal thereof, and a second unidirectionally conducting indicating means similar to said first indicating means and having a terminal corresponding to said one terminal connected to said first terminal of said second jack means and a terminal corresponding to said other terminal connected to said fourth terminal thereof.

* * * * *